(12) United States Patent
Taniyama et al.

(10) Patent No.: US 8,104,792 B2
(45) Date of Patent: Jan. 31, 2012

(54) AIRBAG DEVICE

(75) Inventors: Hiroyuki Taniyama, Settsu (JP); Yoshio Shimazaki, Settsu (JP); Kou Sasaki, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 323 days.

(21) Appl. No.: 11/916,834

(22) PCT Filed: May 22, 2006

(86) PCT No.: PCT/JP2006/310103
§ 371 (c)(1),
(2), (4) Date: Dec. 7, 2007

(87) PCT Pub. No.: WO2006/132071
PCT Pub. Date: Dec. 14, 2006

(65) Prior Publication Data
US 2009/0218799 A1    Sep. 3, 2009

(30) Foreign Application Priority Data

Jun. 8, 2005 (JP) .................................. 2005-168869

(51) Int. Cl.
*B60R 21/16* (2006.01)
(52) U.S. Cl. .................. 280/743.1; 280/728.1; 280/731; 280/740; 280/742; 280/743.2
(58) Field of Classification Search ............... 280/743.1, 280/743.2, 728.3, 728.1, 731, 740, 742
See application file for complete search history.

(56) References Cited

U.S. PATENT DOCUMENTS

| | | | | |
|---|---|---|---|---|
| 3,907,330 | A | * | 9/1975 | Kondo et al. ................. 280/731 |
| 5,558,365 | A | * | 9/1996 | Oe et al. ........................ 280/731 |
| 5,560,264 | A | * | 10/1996 | Xolin et al. ..................... 74/552 |
| 5,887,892 | A | * | 3/1999 | Burdack et al. ............... 280/731 |
| 5,899,487 | A | * | 5/1999 | Fischer ...................... 280/728.3 |
| 5,924,725 | A | * | 7/1999 | Kozyreff et al. ............. 280/731 |
| 6,070,904 | A | * | 6/2000 | Ozaki et al. ............... 280/743.1 |
| 6,206,409 | B1 | | 3/2001 | Kato et al. |
| 6,217,067 | B1 | | 4/2001 | Derrick |
| 6,588,794 | B1 | * | 7/2003 | Derrick et al. ............ 280/728.3 |
| 6,669,229 | B2 | * | 12/2003 | Thomas ........................ 280/732 |

(Continued)

FOREIGN PATENT DOCUMENTS

DE    19809198 A1    9/1998

(Continued)

OTHER PUBLICATIONS

European Search Report dated Feb. 2, 2010, corresponding to EP 06756409.

(Continued)

*Primary Examiner* — Eric Culbreth
(74) *Attorney, Agent, or Firm* — Sughrue Mion, PLLC

(57) ABSTRACT

There is provided an airbag device being excellent in performance of protection of an occupant wherein a folded airbag (10) undergoes sequential and orderly expansion starting from a region where the expansion ought to be started. It is characterized in that a gas rectification member (12') for rectifying and guiding a gas generated from an inflator (30) up to the vicinity of a part of the airbag (10), inflating in the initial stage of the expansion thereof, is provided substantially at the central part of the airbag (10).

14 Claims, 20 Drawing Sheets

U.S. PATENT DOCUMENTS

| | | | |
|---|---|---|---|
| 6,672,614 B2 * | 1/2004 | Endo et al. ................. 280/731 |
| 6,739,620 B2 | 5/2004 | Derrick |
| 6,981,719 B2 * | 1/2006 | Igawa .................. 280/743.2 |
| 7,152,875 B2 * | 12/2006 | Kai ........................ 280/739 |
| 7,261,317 B2 * | 8/2007 | Amamori ................. 280/731 |
| 7,445,238 B2 | 11/2008 | Marriott |
| 2001/0042978 A1 | 11/2001 | Frisch |
| 2002/0089155 A1 | 7/2002 | Tajima et al. |
| 2002/0195800 A1 * | 12/2002 | Florsheimer ............. 280/728.3 |
| 2004/0195808 A1 | 10/2004 | Amamori |
| 2004/0207186 A1 | 10/2004 | Kai |
| 2006/0012157 A1 | 1/2006 | Ishiguro et al. |
| 2006/0267319 A1 * | 11/2006 | Frisch et al. .............. 280/731 |

FOREIGN PATENT DOCUMENTS

| | | | |
|---|---|---|---|
| DE | 20 2004 002 698 U1 | 4/2005 |
| EP | 1464551 A1 | 10/2004 |
| JP | 3-38254 U | 4/1991 |
| JP | 8-268198 A | 10/1996 |
| JP | 1159310 A | 3/1999 |
| JP | 11-180240 A | 7/1999 |
| JP | 11-255056 A | 9/1999 |
| JP | 11-278189 A | 10/1999 |
| JP | 11-321508 A | 11/1999 |
| JP | 2000-85511 A | 3/2000 |
| JP | 2000-127881 A | 5/2000 |
| JP | 2001-163143 A | 6/2001 |
| JP | 2001-180427 A | 7/2001 |
| JP | 2001-287611 A | 10/2001 |
| JP | 2002067851 A | 3/2002 |
| JP | 2002166808 A | 6/2002 |
| JP | 2003-226213 A | 8/2003 |
| JP | 2004122940 A | 4/2004 |
| JP | 2004-256091 A | 9/2004 |
| JP | 2006-341715 A | 12/2006 |
| WO | 98/14353 A1 | 4/1998 |

OTHER PUBLICATIONS

European Search Report Corresponding to European Patent Application No. 06746128.5, dated Jan. 27, 2010.

U.S. Appl. No. 11/994,656, entitled Airbag Device and filed on Jan. 4, 2008.

International Search Report for PCT/JP2006/309297, dated Aug. 1, 2006.

* cited by examiner

Prior Art

Prior Art

Prior Art

Prior Art

AIRBAG DEVICE

TECHNICAL FIELD

The invention relates to an airbag device of an automobile.

BACKGROUND TECHNOLOGY

An airbag device is installed on the central part of a steering device 50P, for example, as shown in FIG. 17, and a member 40P for display is provided on the central part of the airbag device, and on the outer circumference thereof, an airbag cover 16P is provided, having tear-lines on the back side that can be split and torn into a plurality of cover pieces 16Pb when the airbag 16P undergoes inflation and expansion, containing the folded airbag and an inflator therein (see Patent Document 1).

FIG. 18 and FIG. 19 are sectional views showing another airbag device provided with the same structure as that shown in FIG. 17. A diffuser 32R provided with gas exhaust holes 30Ra for exhausting gas is disposed on an inflator 30R of this airbag device, and an inflator attachment opening of an airbag 10R is secured to a position denoted by Q, while a tether belt 11Ra for constraining an extension length of the airbag 10R is provided on the central part of the airbag 10R, and the end of the tether belt 11Ra is secured by a fixture member provided on the head of the inflator.

As is evident from FIG. 18, the diffuser 32R provided with a plurality of gas exhaust holes 32Ra is disposed between the inflator 30R and the folded and contained airbag 10R. At the time of actuation of the inflator 30R, a gas generated from the inflator 30R passes through the gas exhaust holes 32Ra and applies a gas pressure directly to the central part of the folded and contained airbag 10R (see Patent Document 2).

With the structure of this airbag device, the gas pressure is concentrated in the central part of the folded airbag 10R at the time of actuation of the inflator 30R so that a state of the folded airbag 10R is collapsed and the airbag portion above the gas exhaust holes 32Ra is pushed out exponentially in the direction of expansion of the airbag, to thereby enable a tear-line 16Ra provided on the back side of the airbag cover 16R to be ruptured, causing the airbag portions to burst out largely toward a driver seat.

Due to an inertia force of the airbag portions as burst out, a remaining portion of the airbag bursts out at once toward the driver seat. This bursting-out is said to be as "a punching phenomenon" and there is a possibility that the maximum bursting-out velocity reaches 300 km/h, thereby inflicting harm on an occupant.

According to the invention disclosed in Patent Document 2, it seems that an opening of the airbag cover 16R for expansion of the airbag 10R at the time of rupture of the airbag cover 16R is rendered small as a countermeasure against such a punching phenomenon so that the airbag 10R is not burst out at once, resulting in reducing damage caused by the punching phenomenon. However, if the opening is rendered small, when the folded and contained airbag 10R is pushed out at once toward the opening, the airbag 10R is clogged at the opening of the airbag cover so that the airbag portion positioned in the vicinity of the opening is difficult to protrude toward the driver seat due to a gas pressure to be applied from behind.

In this state, there is a possibility that the gas pressure inside the airbag 10R increases and the airbag cover 16R itself undergoes inflation, so that the airbag cover 16R increases the inflation velocity while forcibly expanding its opening so that the airbag 10R bursts out through the opening of the airbag cover 16R. In addition to that, in cases where only the portion which is slipped out of the opening in the initial stage of expansion of the airbag 10R first busts out to undergo inflation and expansion partially, the direction of expansion of the airbag is changed in whole to cause the direction of expansion unstable, thereby deteriorating performance of the airbag device to protect the occupant.

Next, there is described still another conventional airbag device. FIG. 20 is a traverse sectional view of this airbag device. As shown in the figure, an airbag 10L is folded and contained between an airbag cover 16L and an inflator 30L. A tear-line 16La in the shape substantially resembling the letter H is provided on the back side of a front face wall of the airbag cover 16L, and an inflator attachment opening of the airbag 10L is secured to a flange 30Lb provided on the outer circumference of the inflator 30L (see Patent Document 3).

According to this airbag device, a gas pressure is concentrated in the whole back portion of the folded airbag 10L at the time of actuation of the inflator 30L, and concurrently the lump of the airbag 10L above the gas exhaust holes 30La is pushed out exponentially in the direction of expansion of the airbag, to thereby enable the tear-line 16La in the shape substantially resembling the letter H provided on the back side of the airbag cover 16La to be ruptured so that these airbag portions largely burst out toward the driver seat.

Although it is possible to control a quick bursting-out of the airbag in a specific folding manner, it requires a folding manner wherein the airbag is normally difficult to undergoes expansion in order to control a quick bursting-out of the airbag, causing a problem in that expansion time until the airbag is fully expanded is delayed. On the other hand, if the airbag is folded not to delay the expansion time, there occurs a punching phenomenon described as above.

FIG. 21 is a view showing each state of inflation of the airbag with respect to time elapsed from the initial expansion of the airbag of a conventional airbag device. A dummy is postured in a seating position close to the airbag (this seating position is said to be out of normal seating position i.e. Out of Position, hereinafter referred to as "OOP state"). The airbag is formed in the shape of a bag that is expandable into a flat spherical shape (an ellipsoidal shape) by preparing a stitched part P by stitching respective outer circumferential edges of two pieces of cloth substantially circular in shape. Accordingly, the stitched part P is positioned in the center of the side face of the flat spherical airbag at the time of completion of expansion.

As shown in FIG. 21A to 21D, when the airbag undergoes inflation in the manner that the stitched part P thereof rests against the neck of the dummy, the portion of the airbag rested against the neck of the dummy is controlled in inflation immediately before the airbag is completely inflated, so that the controlled portion, particularly the portion that becomes maximum in airbag diameter, undergoes inflation exponentially in the completion stage of inflation of the airbag, leading to the possibility of inflicting harm on the neck. A phenomenon which occurs when the gas generated from the inflator increases the inner pressure of the airbag exponentially just before or at a moment of the completion of inflation (a phenomenon in which an occupant is repelled by the airbag which is caused by the increase of the inner pressure of the airbag exponentially from a loosened state) is said to be a so-called "a membrane phenomenon".

Meanwhile, as the method of folding the airbag, there are known (1) a method of folding like bellows the airbag, (2) a method of folding the airbag in the shape of a roll, (3) a method of folding like bellows the airbag in the direction of extension of the airbag sterically (disclosed in Patent Document 2), and so forth. Although Patent Document 3 does not disclose with which method the airbag is folded, the punching phenomenon will occur in any folding method except the specific folding manner disclosed as above. However, there was no specific means to prevent occurrence of the membrane phenomenon in the OOP state disclosed as above except the regulation of opening manner of the airbag cover.

Patent Document 1: U.S. Pat. No. 6,739,620-B1
Patent Document 2: US-2001/42978-A1
Patent Document 3: JP-3-38254-U

DISCLOSURE OF THE INVENTION

Problems to be Solved by the Invention

It is an object of the invention to provide an airbag device capable of preventing occurrence of a punching phenomenon even in an folded and contained airbag regardless of its methods of folding, and of reducing damage inflicted on an occupant even in an OOP state, the airbag device being excellent in performance of protection of an occupant even in a normal expansion of the airbag and also provide an airbag device which is simple in structure and low cost and being usable as an airbag device for an occupant seat such as a driver seat and a front passenger seat, being capable of smoothly expanding the airbag with relatively low pressure and of reducing a pressure loss without reinforcing a strength of each member such as a housing, a cover and so forth more than required.

Means for Solving the Problem

To achieve the above object, the invention disclosed in claim 1 is an airbag device comprising, an inflator, an airbag communicating with the inflator for undergoing inflation by a gas generated from the inflator; and a holding member for holding the airbag in a state as folded and contained therein, and pressing down the outer circumferential side of the airbag, to thereby restrain inflation and expansion of the airbag in the direction of the side thereof, caused by the gas generated from the inflator at least in the initial expansion of the airbag, wherein a gas rectification member for rectifying and guiding the gas generated from the inflator up to the vicinity of a part of the airbag, inflating in the initial expansion thereof, is provided substantially at the central part of the airbag.

The invention disclosed in claim 2 is the airbag device disclosed in claim 1 characterized in that the airbag is folded and contained on a side of the outer circumference of the gas rectification member.

The invention disclosed in claim 3 is the airbag device disclosed in claim 1 or 2 characterized in that the gas rectification member is tubular in shape, the airbag is provided with an inflator communicating port for communicating with the inflator, and the gas rectification member is extended from a peripheral edge of the inflator communicating port up to the vicinity of the part of the airbag that will inflate in the initial expansion thereof.

The invention disclosed in claim 4 is the airbag device disclosed in any of claims 1 to 3 characterized in that the gas rectification member is made of a woven cloth.

The invention disclosed in claim 5 is the airbag device disclosed in any of claims 1 to 4 characterized in that the gas rectification member is disposed as a member having a function for protecting the airbag from heat of the inflator and impactive pressure thereof.

The invention disclosed in claim 6 is the airbag device disclosed in any of claims 1 to 5 characterized in that the airbag is folded like bellows toward an occupant side.

The invention disclosed in claim 7 is the airbag device disclosed in any of claims 1 to 6 characterized in that the holding member is made of a woven cloth for containing the airbag covered thereby.

The invention disclosed in claim 8 is the airbag device disclosed in any of claims 1 to 7 characterized in that the holding member is contained in an airbag cover.

The invention disclosed in claim 9 is the airbag device disclosed in claim 8 characterized in that tear-lines to be split and torn upon generation of the gas in the inflator to thereby form an expansion port of the airbag are provided on a back side of the airbag cover.

The invention disclosed in claim 10 is the airbag device disclosed in any of claims 1 to 9 characterized in that a tether belt for restraining an extension length of the airbag, toward an occupant side, is disposed in the airbag.

The invention disclosed in claim 11 is the airbag device disclosed in any of claims 1 to 6 characterized in that the airbag cover is used instead of the holding member.

The invention disclosed in claim 12 is the airbag device disclosed in claim 11 characterized in that tear-lines are provided on the airbag cover at a position facing to the part of the airbag, inflating in the initial expansion of the airbag where the holding member in the airbag cover rectifies and guides the gas.

Effect of the Invention

When the airbag 10 undergoes expansion, flow of the gas generated from the inflators is rectified by the gas rectification member, to be guided up to the vicinity of the part of the airbag that will inflate in the initial expansion thereof, and concurrently, the holding member prevents the airbag from inflating in the direction of the side face thereof, so that the airbag undergoes sequential and orderly expansion starting from a region thereof, to be expanded from the first, thereby preventing a punching phenomenon whereby the airbag partially bursts out in a lump toward the occupant side.

Since the gas rectification member compresses the folded airbag between itself and the holding member by the agency of the gas pressure in the inflator by disposing the folded airbag on the outer circumference of the gas rectification member, the folded and contained airbag can be firmly maintained so that the folded airbag collapses smoothly due to the impact given in the initial expansion thereof, thereby preventing occurrence of the punching phenomenon with success.

Further, since the airbag device has a structure in which a force applied to the gas rectification member can be fended off with the airbag so that the gas rectification member no longer requires a particular strength. Still further, the protective member for protection of the periphery of the inflator communicating port can be used as the gas rectification member and since the protective member spreads from the periphery of the inflator communicating port toward the outer circumference of the concentric circle from the first, when the protective member is disposed on the inner circumference side of the folded airbag, the protective member is actually multiple-folded to thereby form pleats, so that with just one sheet of the protective member, it is possible to obtain the same protection effect as is obtained with several sheets of the protective member.

As mentioned above, the protective member originally intended for protection of only the peripheral portion of the inflator communicating port can carry out a function as a protective member for protection of the whole inner face of the airbags, thereby very efficiently protecting the airbag in whole.

BRIEF DESCRIPTION OF THE DRAWINGS

FIG. 5A is a front elevation of a cushion ring while

FIG. 6A is a see-through perspective view showing the interior of an inflated airbag while

FIGS. 7A to 7H each are a schematic view showing an operating procedure for folding the airbag with the use of an airbag-folding machine;

FIG. 10A is a perspective view of an airbag cover, while

FIGS. 12A, 12B each are a view showing an expansion action of the inflating airbag device, wherein FIG. 12A shows inflating airbag device at the initial expansion and FIG. 12B shows the airbag device at the completion of expansion;

EXPLANATION OF REFERENCE NUMERALS

10a . . . airbag main body, 11a . . . tubular tether belt, 12 . . . protective member, 12' . . . gas rectification member, 14 . . . holding member, 16 . . . airbag cover, 20 . . . linkage member, 22 . . . cushion ring, 24 . . . base plate, 30 . . . inflator

BEST MODE FOR CARRYING OUT THE INVENTION

Figure 1:
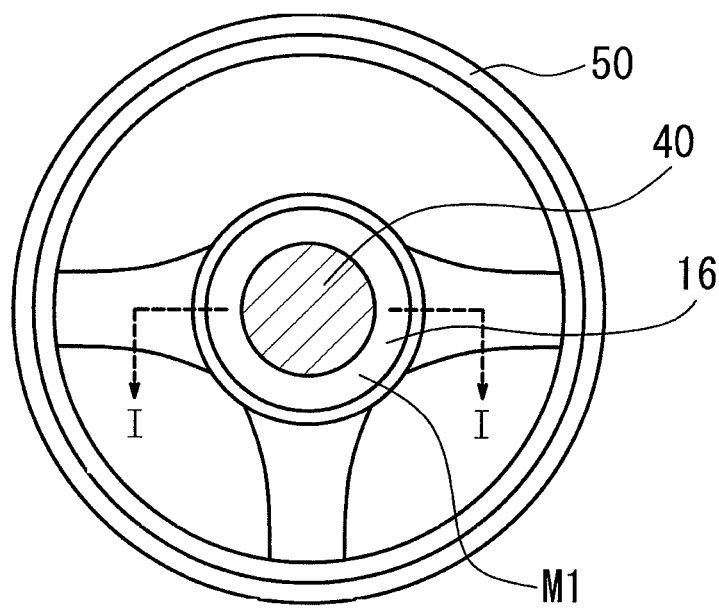
FIG. 1 is a front elevation showing an airbag device fitted to a steering wheel.
Figure 2:
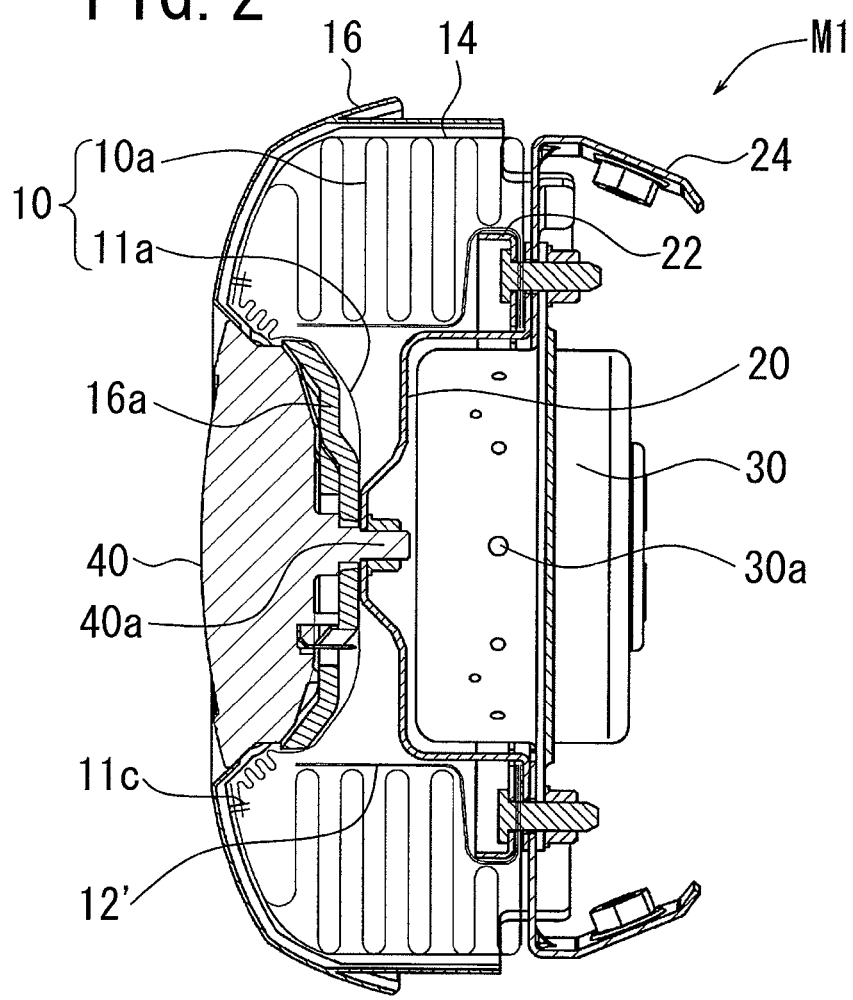
FIG. 2 is a traverse cross-sectional view of the airbag device, taken on arrow I-I of FIG. 1.

There is described hereinafter an airbag device M1 for a driver seat according to a first embodiment of the invention, with reference to the accompanying drawings. FIG. 1 is a front elevation showing the airbag device M1 is fitted into a steering wheel, and FIG. 2 is a cross-sectional view thereof taken on arrow I-I of FIG. 1. As shown in FIGS. 1, and 2, the airbag device M1 is assembled into the central part of a steering wheel of a vehicle and comprises a decorative member 40, an airbag 10 and an airbag cover 16. For convenience's sake, a side of the decorative member 40 on the side of an occupant is referred to as a front side while a side thereof opposite from the front side is referred to as a back side in the present specification.

As shown in FIG. 2, the airbag 10 comprises an airbag main body 10a and a tubular tether belt 11a for restricting an extension length of the airbag main body 10a, and the airbag 10 folded like bellows toward the front side (the occupant side) is contained within the airbag cover 16.

The airbag 10 is covered with a holding member 14 in such a way as to press down a side face of the airbag 10 on the outer circumference thereof, to thereby restrain inflation and expansion of the airbag 10 in the direction of the side face thereof. The main body 10a and the holding member 14 are secured to a base plate 24 by a cushion ring 22 inserted into the airbag 10. Further, the airbag cover 16 is secured to the base plate 24 in such a way as to cover up airbag 10 and such.

Meanwhile, an attachment bolt 40a positioned on the back side of a depressed part 16a formed on the airbag cover 16 on the side of the occupant and protruding toward the back side of the decorative member 40 is secured to a connecting member 20 with a nut, thereby clamping an end of the tubular tether belt 11a between those members. Further, respective ends of the connecting member 20 are clamped between the cushion ring 22 and the base plate 24 to be thereby secured to the base plate 24.

Further, as described in detail later, reference numeral 12 denotes a protective member, 12' denotes a gas rectification member, and 11c denotes a stitched part where the tubular tether belt 11a is stitched to the airbag main body 10a.

Now, there are described hereinafter respective structures of the base plate 24, the connecting member 20 and the cushion ring 22.

Figure 3:
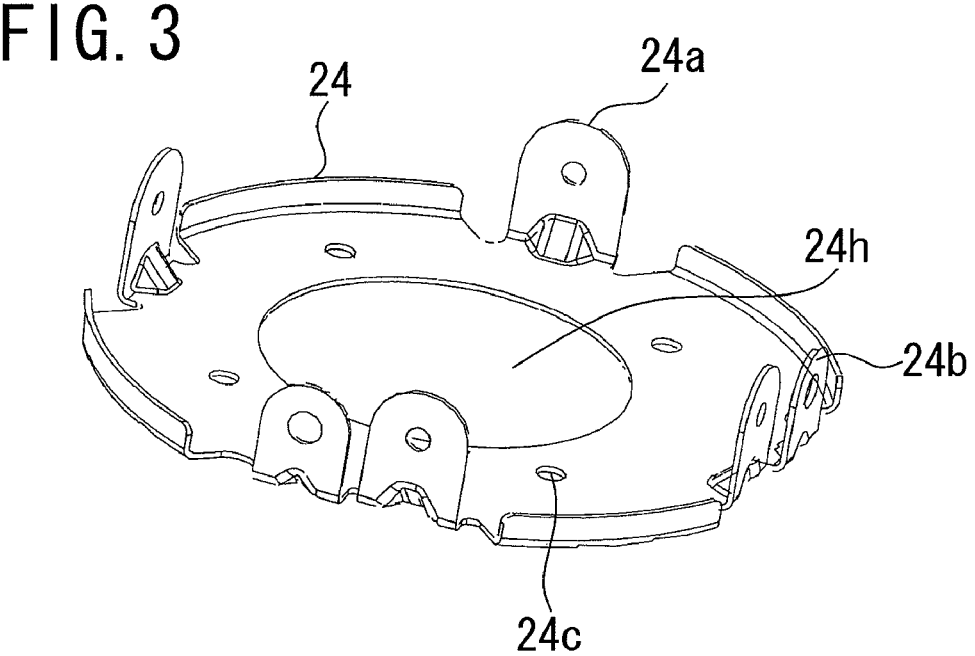
FIG. 3 is a perspective view showing a back side of a base plate.

FIG. 3 is a perspective view showing the back side of the base plate 24 shown in FIG. 2. The base plate 24 is formed substantially in the shape of a disk, and an opening 24h in which an inflator can be fitted is formed at the central part of the base plate 24, while 4 pieces of airbag cover attachment pieces 24a and a pair of attachment pieces 24b for attachment of the base plate 24 itself are formed in such a way as to be erected from the disk. The base plate 24 is for integrally securing the inflator 30, the airbag 10 and the previously described decorative member 40 with each other, and the pair of the attachment pieces 24b are for securing the base plate 24 to the steering wheel.

The inflator 30 is formed substantially in the shape of a thick disk and is made up so as to exhaust gas upon detection of a predetermined impact. The inflator 30 has an upper portion with a gas exhaust port 30a formed therein penetrating through the opening 24h of the base plate 24 and a flange formed substantially in an intermediate part of inflator 30 in the direction of thickness thereof in close contact with the back side of the base plate 24, thereby being secured together with the cushion ring 22, to the base plate 24 through the attachment holes 24c of the base plate 24. That is, the inflator 30 is secured to the base plate 24 with the gas exhaust port 30a of the inflator 30 disposed on the front side of the base plate 24, so that an exhaust gas from the inflator 30 is exhausted on the front side of the base plate 24.

Figure 4:
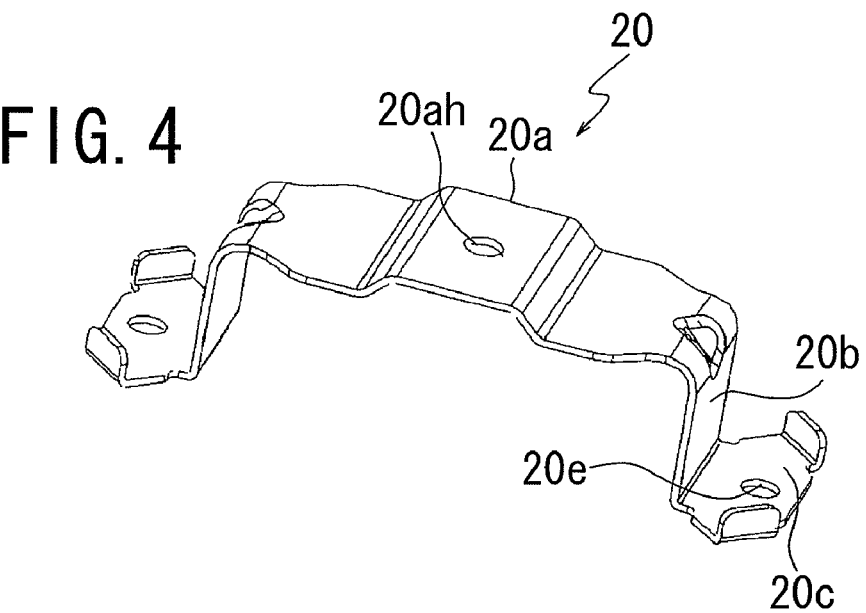
FIG. 4 is a perspective view of a connecting member.

FIG. 4 is a perspective view of the connecting member 20 shown in FIG. 2. The connecting member 20 is made of a metal piece in a sheet-like shape, comprising a central part 20a provided with a hole 20ah in which the attachment bolt 40a is fitted, a leg part 20b formed on each of both sides of the central part 20a bent substantially vertically therefrom, and attachment foots 20c bent substantially right angles to the respective leg parts 20b. Further, each attachment foot 20c is provided with an attachment hole 20e made so as to correspond to the attachment holes 22a of the cushion ring 22 and the attachment holes 24c of the base plate 24, so that both connecting member 20 and the base plate 24 are tightened up each other with bolts 22d formed on the cushion ring 22.

Figure 5A:
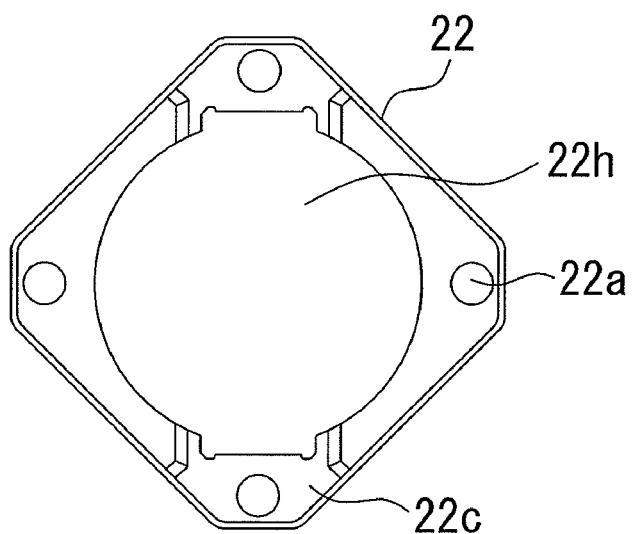
Figure 5B:
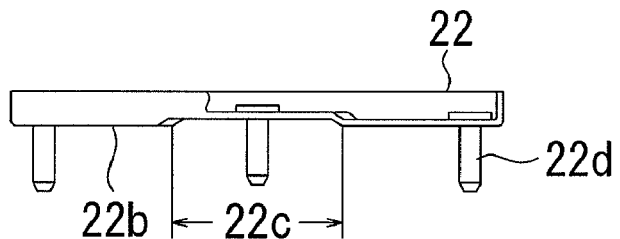
FIG. 5B is a side view showing a part thereof, in section.

FIG. 5A is a front elevation of the cushion ring 22 shown in FIG. 2, and FIG. 5B is a side view showing a part thereof, in section. As shown in FIG. 5A, the cushion ring 22 is substantially in the shape of a rectangle, a central part thereof is provided with an insertion opening 22h for the inflator 30, and the bolt 22d for attaching the cushion ring 22 to the base plate 24 is provided in respective corners of the cushion ring 22 around the insertion opening 22h on the back side of the cushion ring 22. Further, the back side of the cushion ring 22 constitutes a butting surface 22b that can be butted against the surface of the base plate 24 through the airbag 10 interposed therebetween, the butting surface 22b has a depressed part 22c formed by, for example, drawing work, as is evident from the side view of FIG. 5B. The depressed part 22c is formed so as to have a draw depth substantially equal to a thickness of the attachment foot 20c of the connecting member 20 when the cushion ring 22 is connected with the connecting member 20.

Now, the airbag 10 is described hereinafter with reference to FIGS. 6A, and 6B.

Figure 6A:
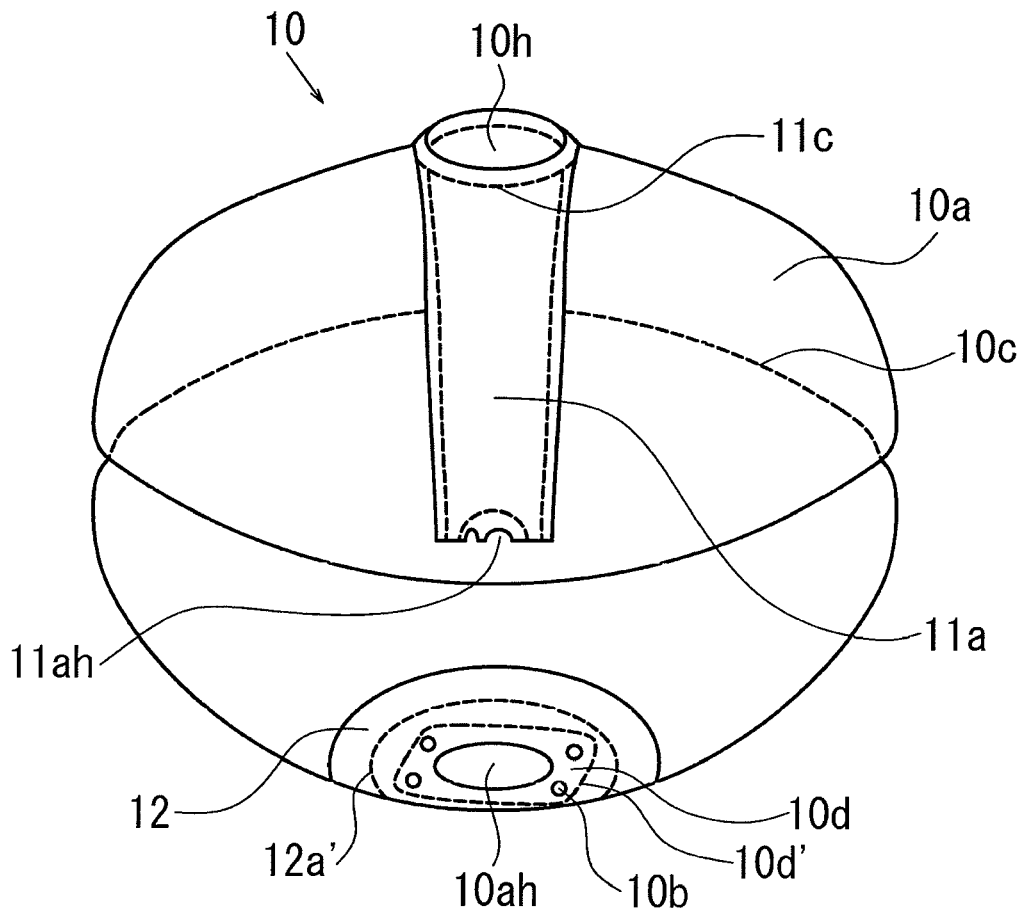
Figure 6B:
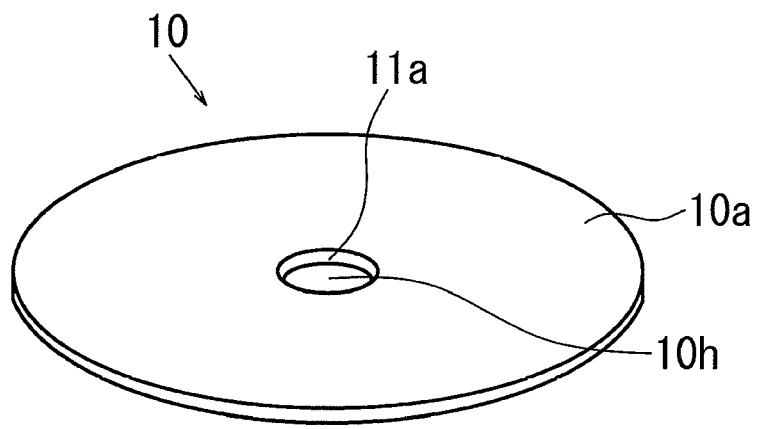
FIG. 6B is a perspective view showing the uninflated airbag.

FIG. 6A is a see-through perspective view showing the interior of the inflated airbag 10, and FIG. 6B is a perspective view showing the un-inflated airbag 10. For brevity, the decorative member 40 and so forth inside the tubular tether belt 11a, the inflator 30 joined with the decorative member 40 and so forth are not shown in those figures.

The airbag main body 10a is formed in the shape of a bag that is expandable into a flat spherical shape (an ellipsoidal shape) by joining respective outer circumferential edges of two pieces of cloth substantially circular in shape with each other by stitching. A notched part 10h of circular shape for insertion of the depressed part 16a of the airbag cover 16 is formed substantially at the central part of the airbag main body 10a on the front side thereof, and an inflator attachment opening 10ah associating with the inflator for introducing an generated gas into the airbag is formed substantially at the central part of the airbag main body 10a on the back side thereof, while four small holes 10b for insertion of the respective bolts 22d (see FIG. 5B) of the cushion ring 22 are made on the peripheral part 10d around the inflator attachment opening 10ah.

The protective member 12 for protecting the airbag from heat and an impactive pressure generated by the inflator is overlaid on the peripheral part 10d and stitched to a peripheral edge of the inflator attachment opening 10ah of the airbag 10. With the present embodiment, the protective member 12 is also used as a gas rectification member having a function for guiding the gas up to the vicinity of a part of the airbag (a part of the airbag expanding from an anticipated rupture part 14h of the holding member 14 of circular shape) that will inflate in the initial expansion thereof by rectifying a gas flow direction.

As shown in FIG. 6A, the protective member 12 is made of, for example, a woven cloth and is circularly formed having a hole at the center thereof, and a diameter of the hole is identical to that of the inner periphery of the inflator attachment opening 10ah, while an outer circumference thereof is for example at least three times as large in diameter as the inner circumference. When attaching the protective member 12 to the inflator attachment opening 10ah, an inner peripheral edge of the protective member 12 is stitched to an outer circumferential part 10d' of the peripheral part 10d in alignment with the peripheral edge of the inflator attachment opening 10ah and an outer circumferential part 12' of a concentric circle of the peripheral part 10d. The protective member 12 has the function for protecting the airbag from heat and impact of gas pressure as well as the function as the rectification member for rectifying gas after the airbag 10 is folded and contained. Further, one sheet of the protective member 12 is effective, however, two or more sheets thereof may be adopted, and may be used for the gas rectification member.

The airbag 10 comprises the airbag main body 10a and the tubular tether belt 11a for restricting the extension length of the airbag main body 10a, the airbag main body 10a is provided with a stitched part 10c formed by stitching respective outer peripheral edges of two pieces of base fabrics (a base fabric of the surface portion of the airbag main body and a base fabric of the rear surface portion thereof) substantially circular in shape with each other, and an airbag after stitched is turned inside out, thereby forming the airbag main body in the shape of the bag expandable into the flat spherical shape (the ellipsoidal shape).

As is evident from FIG. 6B, the two pieces of the base fabrics substantially circular in shape are substantially identical in size to each other. The airbag 10 after stretched substantially to a full length in the direction of extension of the thereof as shown in FIG. 6A (upper part of the figure) is folded like bellows and vertically compressed to be contained in the airbag cover 16. At the same time, not only the airbag main body 10a but also the tubular tether belt 11a is folded like bellows in the direction of a tube length thereof. The tubular tether belt 11a when stretched substantially to the full length thereof has a length substantially equal to a length of the front and back base fabric of the airbag main body 10a respectively.

Now, there is described hereinafter a method of folding like bellows the airbag 10 stretched substantially to the full length thereof in the direction of the extension of the airbag as shown in FIG. 6A (upper part of the figure) to be vertically compressed. For the method of folding like bellows the airbag 10, an airbag-folding machine may be used. FIGS. 7A to 7H are schematic views showing operating process for folding the airbag with the airbag-folding machine. The operating process for folding the airbag will be described hereinafter with reference to those schematic views.

Figure 7A:
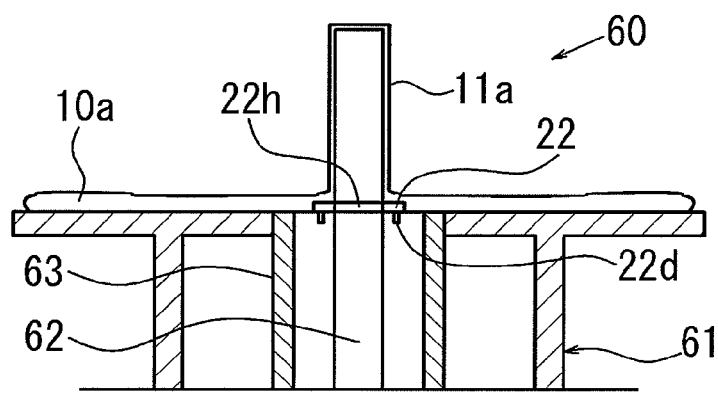

As shown in FIG. 7A, the airbag-folding machine 60 comprises a table 61 having a support member 62 columnar in shape for supporting the tubular tether belt 11a and an outer cylinder 63 coaxial with the support member 62 for containing the airbag 10 on the outside of the support member 62, and a support unit (not shown) for supporting a clamping member 64 columnar in shape (see FIG. 7C), positioned vertically above the support member 62 and substantially identical in outer diameter thereto, to thereby clamp the upper end of the tubular tether belt 11a between a clamping member 64 and the support member 62. Since the outer diameter of the support member 62 is smaller than the inside diameter of the insertion opening 22h of the cushion ring 22, the support member 62 can be inserted through the insertion opening 22h to thereby ascend as described later.

Further, as shown in FIG. 7A, the bolts 22d of the cushion ring 22 are inserted into the four small holes 10b provided on the peripheral part 10d (see FIG. 6A) of the airbag 10 respectively, and the bolts 22d are engaged with four holes provided on the periphery of the support member 62 of the table 61 on the upper end thereof to be secured to the four holes. The head of the support member 62 is inserted through the insertion opening 22h to thereby be ascended and inserted into a tube portion of the tubular tether belt 11a, and the airbag main body 10a is placed flat on the top of the table 61 outside of the ascended support member 62.

Figure 7B:
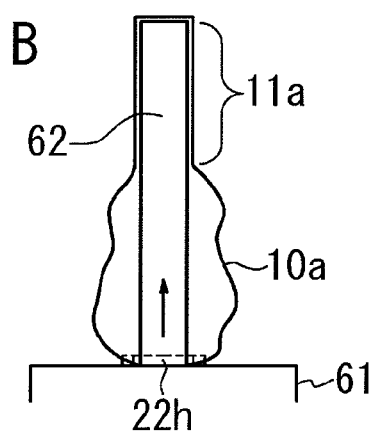

When a lower end of the tubular tether belt 11a is pushed up with the head of the support member 62 inserted into the tube portion of the tubular tether belt 11a through the insertion opening 22h of the cushion ring 22 as shown in FIG. 7A, the airbag main body 10a is also pushed up as shown in FIG. 7B.

As described in the foregoing, since the length of the tubular tether belt 11a is substantially equal to half the length of the airbag main body 10a, the support member 62 ascends to a position at a height at the maximum about three times of the length of the tubular tether belt 11a and stops at the position, whereupon the tubular tether belt is manually passed through a protrusion provided at the tip of the support member 62 through the attachment hole 11ah, thereby implementing positioning of the tubular tether belt 11a.

Figure 7C:
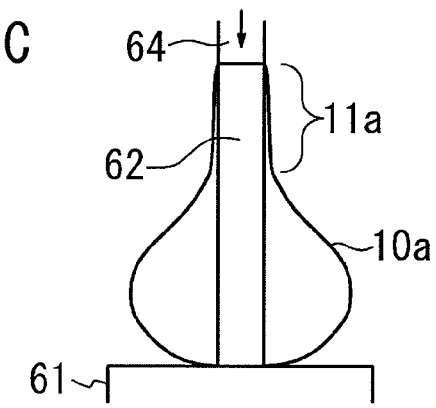

As shown in FIG. 7C, the clamping member 64 descends to clamp said positioned tubular tether belt 11a between the support member 62 and the clamping member 64, the support member 62 and the clamping member 64 descend with the tubular tether belt 11a being kept in clamped position.

Figure 7D:
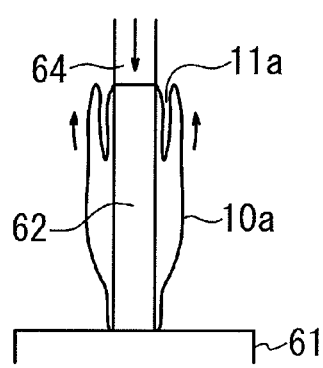

As shown in FIG. 7D, upon the support member 62 and the clamping member 64 descending to a position corresponding to half the length of the tubular tether belt 11a, descending operation is stopped, then the airbag main body 10a placed on the outside is manually pulled up as shown in FIG. 7D. By so doing, the tubular tether belt 11a is folded substantially at an intermediate position thereof.

Figure 7E:
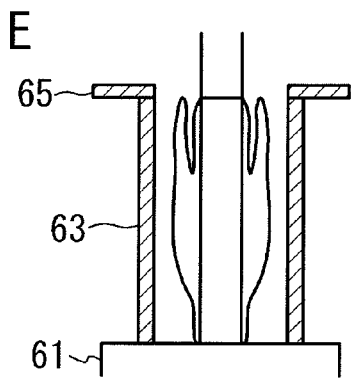
Figure 7F:
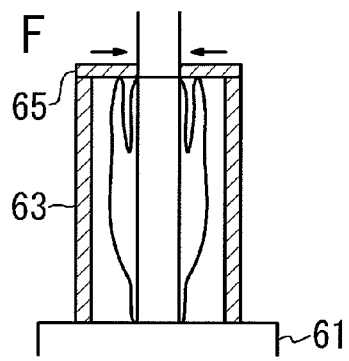
Figure 7D:
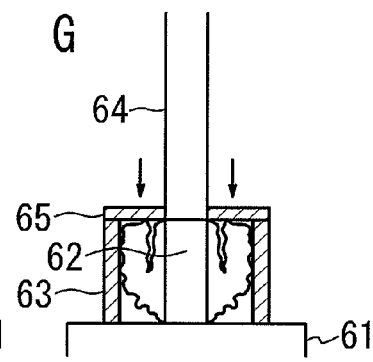
Figure 7H:
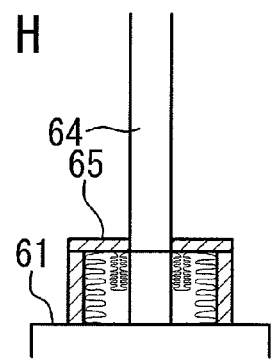

As shown in FIG. 7E, the outer cylinder 63 ascends from the table 61 up to a clamping position of the upper end of the tubular tether belt 11a, thereby containing the airbag 10 between the outer cylinder 63 and the support member 62. As shown in FIG. 7F, with the outer cylinder 63 at that position, two pieces of plates 65, each having a hole bilaterally symmetric and semi-circular in shape, are caused to slide on an upper end of the outer cylinder 63 from the right side and the left side thereof respectively, to be fitted into a fitting groove (not shown) provided at a lower end of the clamping member 64.

Then, as shown in FIG. 7G, the support member 62, the clamping member 64 and the outer cylinder 63 in keeping that position are caused to concurrently descend, whereupon the folded tubular tether belt 11a overlaid together with the airbag main body 10a will be folded like bellows while being compressed. Upon completion of compression of the airbag 10 (see FIG. 7H), the plates 65 are removed, and subsequently the support member 62, the clamping member 64 and the outer cylinder 63 concurrently revert to respective original positions, thereby completing the operation for folding the airbag 10.

Meanwhile, the length of the airbag 10 has been described in the foregoing as the length of the tubular tether belt 11a is substantially equal to half the length of the airbag main body 10a when the airbag 10 is stretched to the full length thereof, however, it is to be pointed out that the invention is not limited to the length described, and that the respective positions where the support member 62 and the clamping member 64 stop after descending as well as the position where the support member 62 stops may be decided depending on a length of the airbag 10.

Figure 8A:
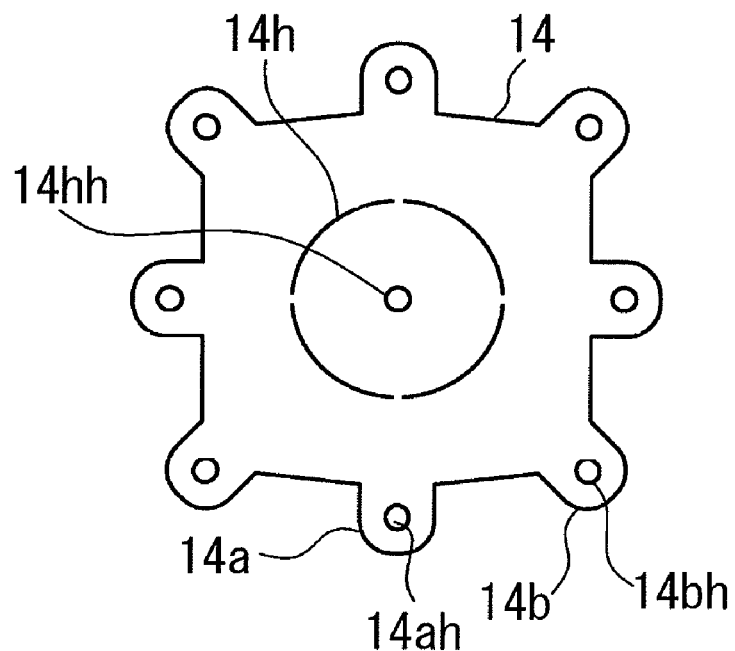
FIG. 8A is an expansion view of a holding member prior to covering the airbag.

FIG. 8A is an expansion view of the holding member 14 prior to covering the airbag 10. The holding member 14 in the shape of an approximate square is made of a woven cloth, and an attachment bolt insertion hole 14hh circular in shape is provided at the center thereof while eight holes 14ah, 14bh, to be engaged with the bolts 22d of the cushion ring 22 respectively, are provided at the respective centers of four sides of the approximate square, and at respective corners of the approximate square along respective diagonal lines thereof respectively. As described later in detail, the attachment bolt insertion hole 14hh of the holding member 14 is a hole for use in insertion of the attachment bolt 40a shown in FIG. 2. Reference numeral 14h denotes the anticipated rupture part of the holding member 14, substantially circular in shape, delineated by perforations, and the anticipated rupture part 14h is provided in order to facilitate rupture in the initial expansion of the airbag, a size of the anticipated rupture part 14h being sufficient to allow respective diameters of the depressed part 16a of the airbag cover 16 and the decorative member 40 to pass through the anticipated rupture part 14h.

Figure 8B:
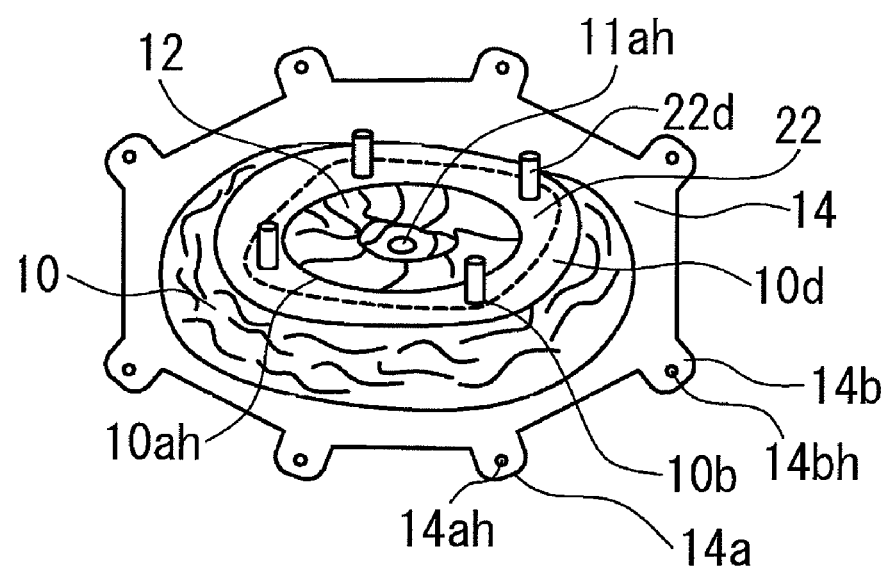
FIG. 8B is a perspective view showing the back side of the folded airbag.

FIG. 8B is a perspective view showing the back side of the holding member 14 prior to covering the airbag 10 and the back side of the airbag 10 as folded by the airbag-folding machine 60 previously described. The four pieces of the holes 14ah are engaged with the bolts 22d of the cushion ring 22, protruding from the airbag 10 as folded respectively. Thereafter, the holes 14bh positioned on the respective diagonal lines are all engaged with the opposite bolts 22d.

Figure 8C:
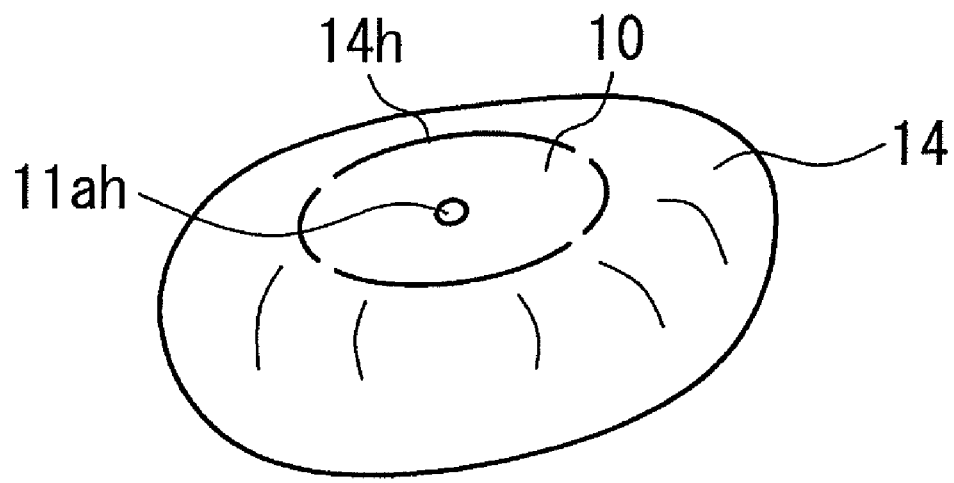
FIG. 8C is a perspective view showing the airbag covered with the holding member.

FIG. 8C is a perspective view showing the folded airbag 10 covered with the holding member 14. When covering the airbag 10 by the holding member 14, the airbag 10 is covered by the holding member 14 with the attachment hole 11ah of the tubular tether belt 11a shown in FIG. 6A, to overlie the attachment bolt insertion hole 14hh of the holding member 14.

Figure 8D:
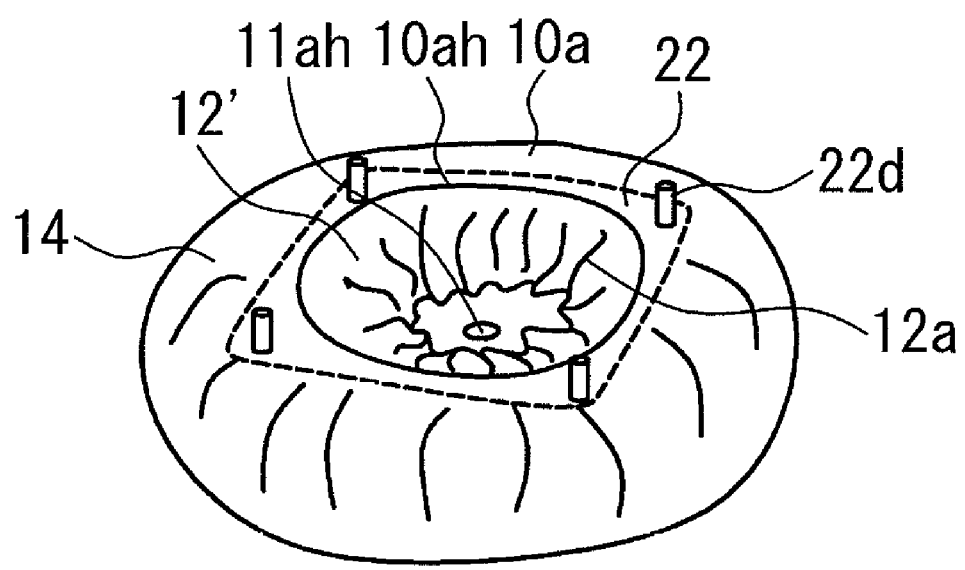
FIG. 8D is a backside view of the airbag covered with the holding member.

FIG. 8D is a backside view of the airbag 10 covered with the holding member 14. As the protective member 12 is folded like bellows inside the airbag 10, the same is pulled out to be thereby disposed along the inner periphery of the airbag 10 folded as shown in FIG. 8D (or FIG. 2). By so doing, the protective member 12 carries out the function as the gas rectification member. A part of the protective member 12, which is once pulled out to be thereby disposed along the inner periphery of the folded airbag 10 shown in FIG. 8D (or FIG. 2) is hereinafter referred to as a gas rectification member 12'. Further, by covering the airbag 10 with the holding member 14, the attachment hole 11ah of the tubular tether belt 11a overlying the attachment bolt insertion hole 14hh is disposed substantially at the center of the inflator attachment opening 10ah of the airbag 10, in other words, substantially at the center of the gas rectification member 12' which is formed to reach the vicinity of the part of the airbag inflating in the initial expansion thereof. The gas rectification member 12' is attached to the foregoing inflator attachment opening 10ah when held by the holding member 14 as shown in FIG. 8D, and has a surface with multiple-folded pleats 12a formed thereon.

Meanwhile, with the airbag 10 held by the holding member 14, when contained in the airbag cover 16, the gas rectification member 12' is extended along the inner wall of the airbag 10 toward the front side from the cushion ring 22 clamping the inflator attachment opening 10*ah* of the airbag 10 up to the vicinity of the tip of the folded tubular tether belt 11*a*, the part of the airbag that will inflate in the initial expansion thereof, as shown in FIG. 2. The gas rectification member 12' in this state is tubular in shape. Since the multiple-folded pleats 12*a* are formed on the surface of the gas rectification member 12' to thereby have great effect as the protective member for protecting the periphery of the inflator attachment opening 10*ah* of the airbag 10 from heat and impact of gas pressure and also have a function as the rectification member for rectifying the gas since the protective member 12 is tubular in shape.

The bolts 22*d* of the cushion ring 22 inserted when folding the airbag 10 are shown as protruded from around the peripheral edge of the inflator attachment part, on the backside of the airbag 10. As a result of covering the airbag 10 with the holding member 14 structured as above, a side face of the airbag 10, on the outer circumference thereof, is pressed down, so that it is possible to restrain the inflation and expansion of the airbag 10 in the direction of the side face thereof, caused by the gas generated from the inflator in the initial expansion of the airbag 10.

Figure 9:
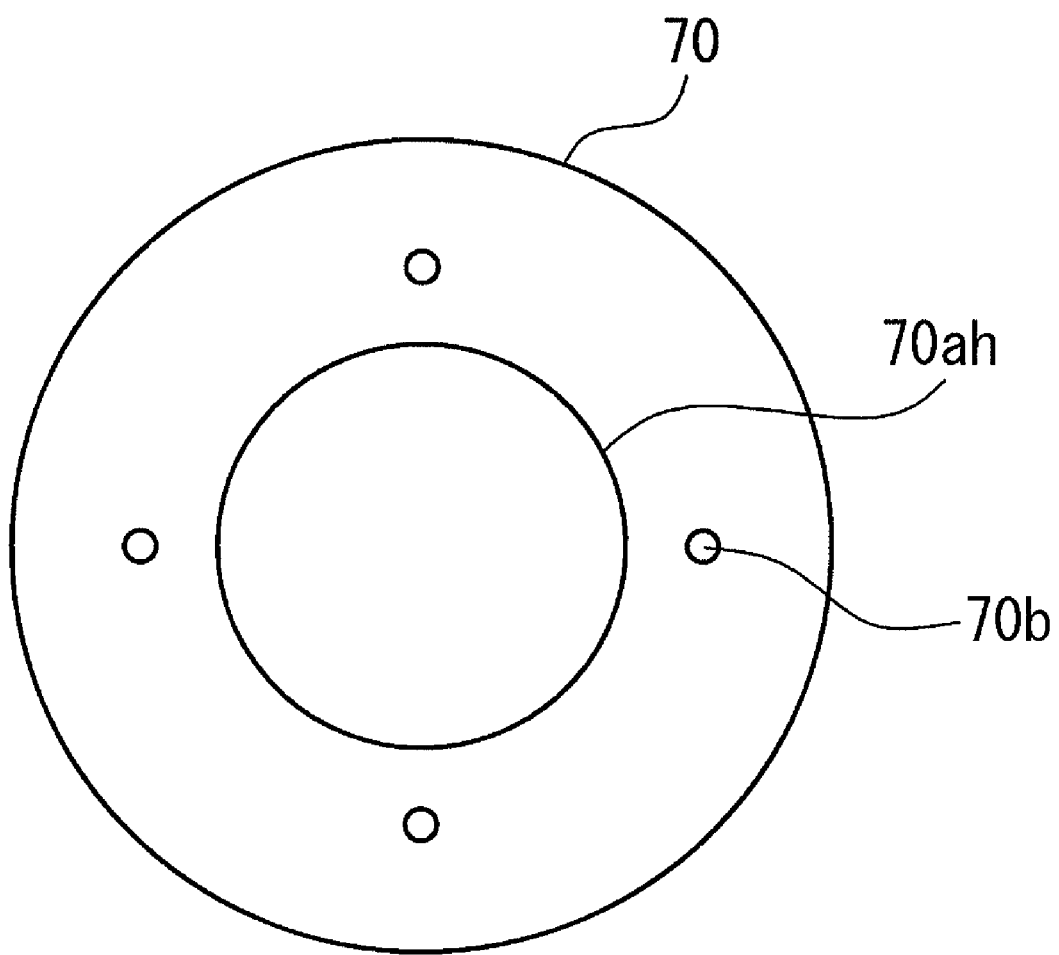
FIG. 9 is an expansion view of a periphery-protective member for protecting a peripheral part provided around an inflator attachment opening.

FIG. 9 is an expansion view of a periphery-protective member 70 for protecting the peripheral part 10*d* provided around the inflator attachment opening 10*ah*. The periphery-protective member 70 is made of a woven cloth, and a surface thereof is coated with a silicone rubber. The periphery-protective member 70 is substantially circular in shape, an insertion opening 70*ah* for use in insertion of the inflator 30 is provided in a central region thereof, and four holes 70*b* through which the bolts described as above are inserted respectively, are provided along a circumference outside the insertion opening 70*ah*. The periphery-protective member 70 is provided in order to prevent the peripheral part 10*d* of the inflator attachment opening 10*ah* from being damaged by an edge of the connecting member 20 when the connecting member 20 is fitted onto the cushion ring 22 from the back side thereof, and the airbag 10 is clamped between both the member 20, 22 to be thereby secured.

In describing a process for covering the airbag 10 with the holding member 14, shown in FIG. 8B, description of the periphery-protective member 70 is omitted, however, prior to engagement of the bolts 22*d* with the holes 14*ah* positioned at the respective centers of the four sides, to be engaged with the bolts 22*d* respectively, the holes 70*b* of the periphery-protective member 70 are fitted onto the bolts 22*d* before placement of the periphery-protective member 70, and subsequently, the airbag 10 is covered with the holding member 14.

If the protective member 12 is made of a woven cloth as in the case of the airbag 10, it need only be sufficient to dispose cylindrically the protective member 12 prepared by overlaying cloth of a predetermined width on the peripheral part 10*d* around the inflator attachment opening 10*ah* to be thereby stitched therewith. The protective member 12 needs to have a length reaching the vicinity of the part of the airbag 10 that will inflate in the initial expansion thereof, preferably a length reaching, for example, the tip of the folded tubular tether belt 11*a*.

For a material of the protective member 12, material other than a material of the airbag 10, for example, a synthetic resin sheet, and any flexible material capable of carrying out the function for rectifying gas can be used. In such a case, it need only be sufficient to securely stick the airbag 10 and the synthetic resin sheet together by appropriate means. Further, it is also possible to carry out the invention with the protective member 12 made as a separate member without securely sticking to the airbag 10. If the protective member 12 is the separate member, the protective member 12 is not limited to the synthetic resin sheet, and may be one made of metal. In such a case, it need only be sufficient to rectify the gas generated from the inflator to flow only toward the part of the airbag that will inflate in the initial expansion thereof. The protective member 12 may be either integrally joined with the bolts 22*d* of the cushion ring 22, or may be attached as a member completely separated therefrom. Otherwise, the protective member 12 may be welded to the base plate 24, or may be formed by deep drawing.

Subsequent assembling work for the airbag device M1 is the same as the work described in the foregoing. As previously described, the protective member 12 needs to have the length reaching the vicinity of the part of the airbag 10 that will inflate in the initial expansion thereof, preferably the length reaching, for example, the tip of the folded tubular tether belt 11*a*.

Figure 10A:
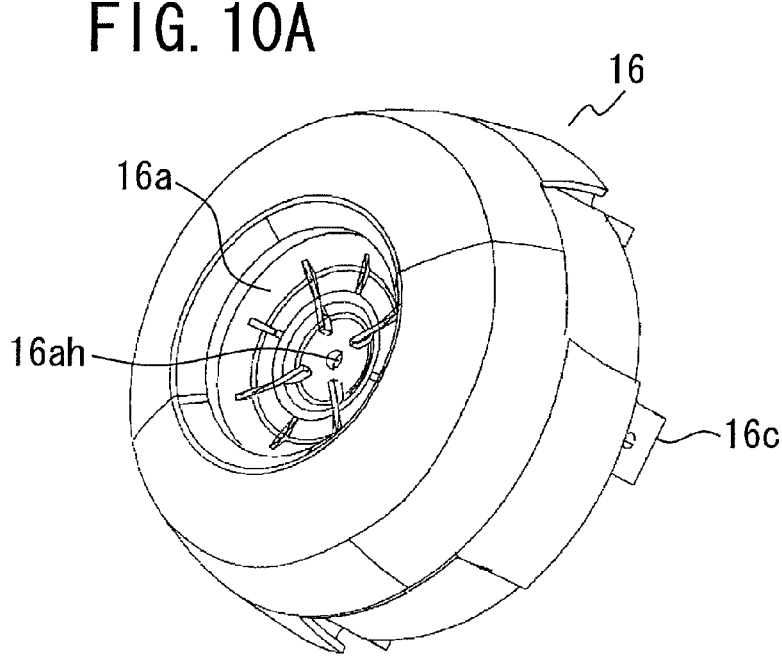

FIG. 10A is a perspective view of the airbag cover 16. The airbag cover 16 is formed of a synthetic resin so as to be substantially in a bowl-like shape, and the depressed part 16*a* for accommodating the decorative member 40 is provided at the central part of the airbag cover 16, as previously described.

The airbag cover 16 is secured to the base plate 24 with rivets through the intermediary of the airbag cover attachment pieces 24*a*. Further, with the decorative member 40 attached to the depressed part 16*a* of the airbag cover 16, a surface of the decorative member 40 is substantially flush with a surface of the airbag cover 16, as shown in FIG. 2.

Figure 10B:
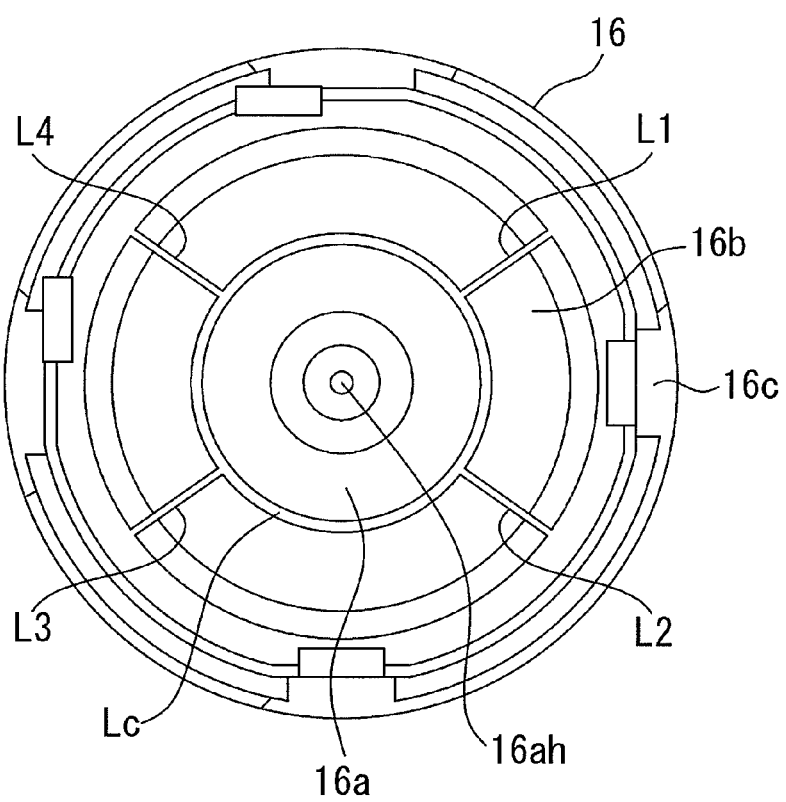
FIG. 10B is a back side view of the airbag cover.

FIG. 10B is a back side view of the airbag cover 16. As shown in the figure, tear-lines (L1 to L4, Lc) in a groove-like shape, capable of splitting and tearing upon the inflation and expansion of the airbag 10, while leaving out the depressed part 16*a* at the center secured by the connecting member 20, are formed on the back side of the airbag cover 16. More specifically, the back side of the airbag cover 16 is provided with a series of the tear-lines comprising the tear-line Lc circular in shape, formed around the depressed part 16*a*, and a plurality of the tear-lines, for example, four pieces of the tear-lines L1 to L4, radially extended from the tear-line Lc, so as to enable the airbag cover 16 to be split into a plurality of cover pieces 16*b* with the depressed part 16*a* left out as it is, upon the airbag cover 16 being subjected to an inflation pressure of the airbag. Further, the airbag cover 16 is secured to the base plate 24 with the rivets such that the airbag cover 16 can be split into the respective cover pieces 16*b* upon the inflation of the airbag 10, and the respective cover pieces 16*b* can independently open up.

With the above structure, when the inflator 30 is actuated and the airbag 10 undergoes inflation and expansion by a gas pressure, the airbag cover 16 is pressed to be split along the respective tear-lines L around the decorative member 40 by a force of the inflation and expansion, whereupon the split cover pieces will open outward respectively, with the depressed part 16*a* in the bowl-like shape at the center being left out as it is, to be then completely cut apart and independently open up respectively, as described above.

Figure 11:
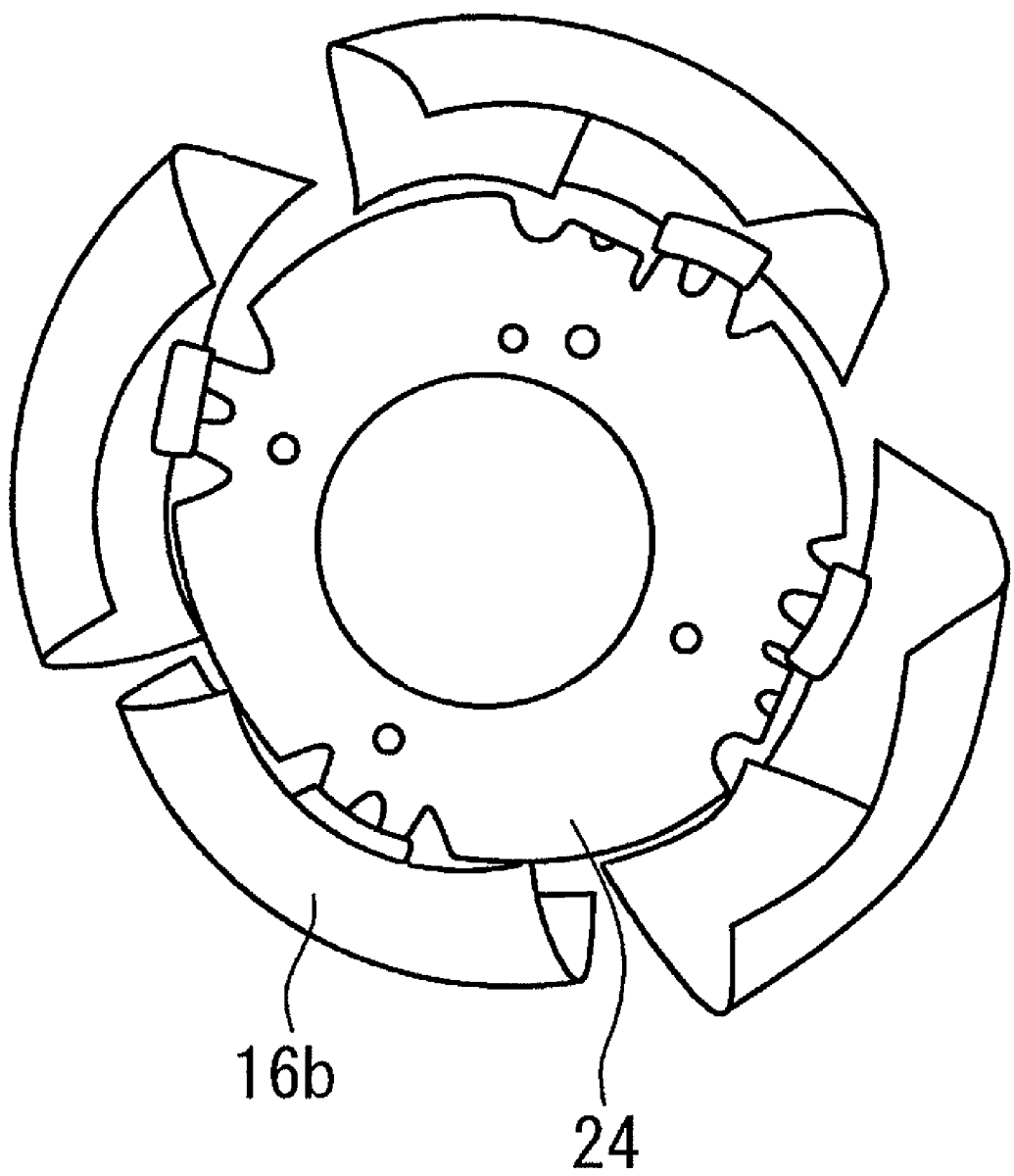
FIG. 11 is a view showing respective cover pieces in as opened-up state, as seen from an occupant side.

FIG. 11 is a view showing the respective opened-up cover pieces 16*b*, as seen from the front side (an occupant side). As shown in the figure, because the airbag cover 16 is split into the respective cover pieces 16*b* upon the expansion of the airbag 10, the airbag cover 16 will not interfere with the expansion of the airbag 10 in the direction of the side face thereof, after the airbag 10 passes through the anticipated rupture part 14*h* of the holding member 14. For brevity, the airbag and so forth are not shown in FIG. 11.

With the embodiment described in the foregoing, there is shown an example where the airbag 10 held by the holding member 14 is contained in the airbag cover 16, however, instead of holding the airbag 10 by the holding member 14, it is also possible to hold the airbag 10 simply by the airbag cover 16 to be contained therein. In this case, the side face of the airbag cover 16 does not undergo splitting and tearing after the expansion of the airbag 10 unlike the case shown in FIG. 11, and if a tear-line in a shape similar to the opening formed by the anticipated rupture part 14h of the holding member 14, substantially circular in shape, as described in detail with reference to FIG. 8A, is formed inside the airbag cover 16, this will make it possible to hold the airbag 10 simply by the airbag cover 16 to be contained therein without the use of the holding member 14. The tear-line in the shape similar to the opening formed inside the airbag cover 16 is provided at a position facing to the part of the airbag where the gas rectification member 12' will rectify and guide gas to inflate in the initial expansion thereof.

Herein, there is described a process for assembling the airbag device M1 with reference to FIGS. 3 to 5, and FIGS. 8 and 10.

On assembling, the airbag 10 with the cushion ring 22 pre-contained therein and packaged in the holding member 14 is contained in the airbag cover 16 by aligning the position of a hole 16ah of the airbag cover 16 with that of the tubular tether belt attachment hole 11ah of the airbag 10. Then, while the connecting member 20 is inserted into the airbag 10 such that a position of the hole 20ah of the central part of the connecting member 20 is aligned with that of the tubular tether belt attachment hole 11ah, the bolt 22d protruding from the depressed part 22c of the cushion ring 22 into the airbag 10, as shown in FIG. 8D, is inserted into the attachment hole 20e of the connecting member 20, thereby fitting the attachment foot 20c into the depressed part 22c.

By inserting the attachment bolt 40a of the decorative member 40 into the hole 16ah of the depressed part 16a of the airbag cover 16 from the front side, it is possible to insert the attachment bolt 40a into the hole 16ah of the airbag cover 16, the attachment hole 11ah of the tubular tether belt 11a of the airbag 10 and the hole 20ah of the central part of the connecting member 20 disposed in alignment with the hole 16ah respectively. By screwing down a nut against the attachment bolt 40a, the attachment bolt insertion hole 14hh and the attachment hole 11ah of the tubular tether belt 11a are clamped and secured between the depressed part 16a of the airbag cover 16 and the central part 20a of the connecting member 20.

Then, by inserting the bolts 22d of the cushion ring 22 into the attachment holes 24c of the base plate 24 respectively, the cushion ring 22 is overlaid on the base plate 24 to thereby fit the base plate 24 to the airbag cover 16, and further the inflator 30 is snapped in between the bolts 22d, thereby screwing down a nut against the respective bolts 22d. By so doing, the inflator attachment opening 10ah and the protective member 12 are clamped and secured between the cushion ring 22, and the connecting member 20. As a result, assembling of the airbag device M1 shown in FIG. 2 is completed.

Figure 12A:
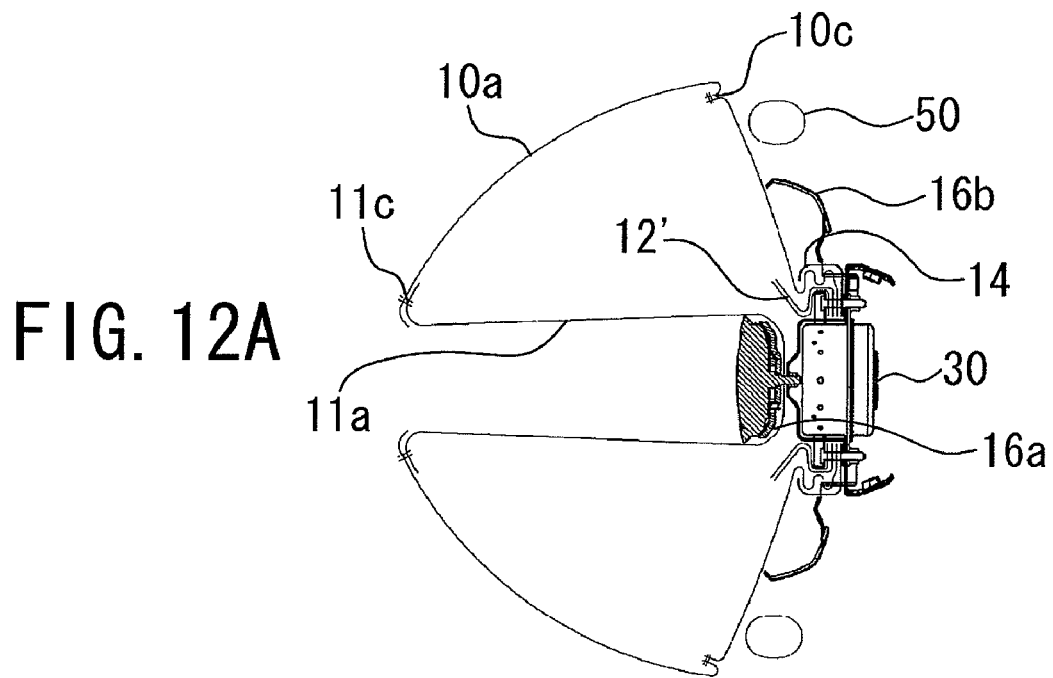
Figure 12B:
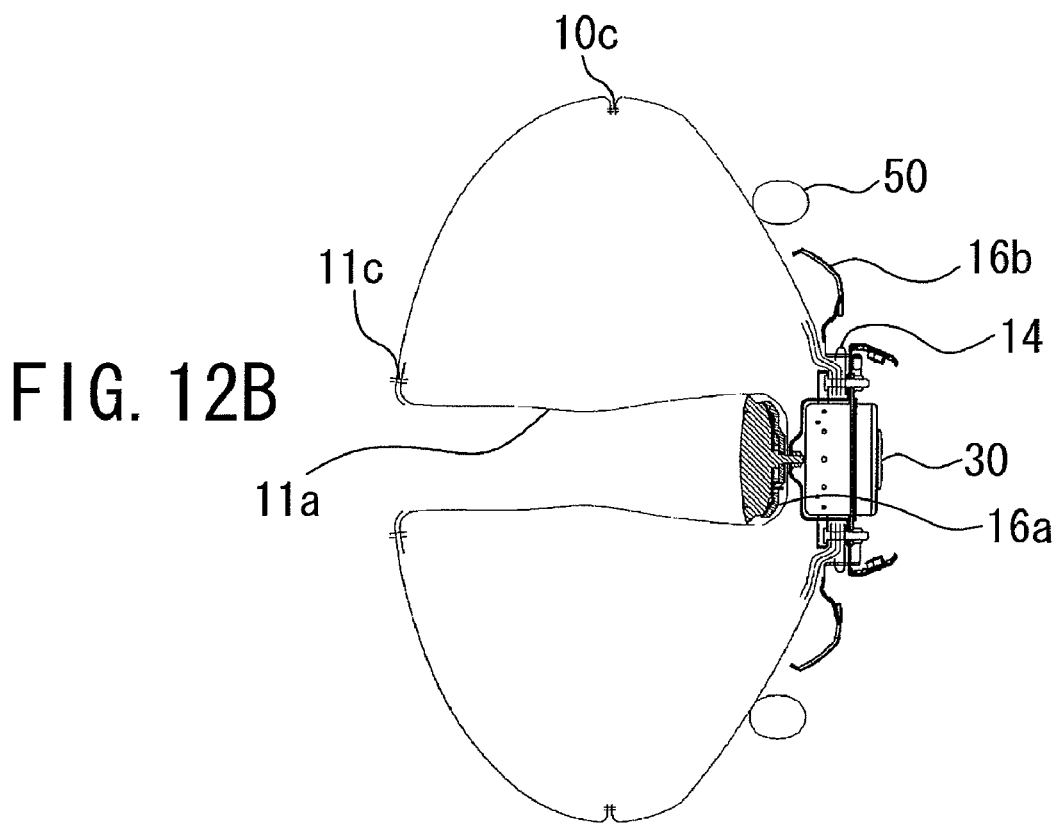

Referring to FIGS. 12A and 12B, there is described hereinafter an expanding action of the airbag device M1.

First, upon detection of an impact due to vehicle collision and so forth, ignition starts in the inflator 30 to thereby cause gas to be generated therein, and the gas is introduced into the airbag 10. When the airbag 10 starts inflation, the airbag cover 16 is subjected to a force of the inflation and is split along the tear-lines L1 to L4, and Lc, that is, with depressed part 16a as left out as it is, whereupon the respective cover pieces 16b will radially expand.

In the initial stage in which the gas is introduced into the airbag 10 and the airbag 10 starts to be inflated after the airbag cover 16 is split, as shown in FIG. 12A, inflation and expansion start from the stitched part 11c formed by stitching together the tubular tether belt 11a and the central part of the base fabric of the airbag 10 that will start inflation in the initial expansion, while enveloping the depressed part 16a with the tubular tether belt 11a, and the surface of the airbag 10 undergoes inflation toward the occupant side.

Since the tubular tether belt 11a is folded in the longitudinal direction of the tube portion at the time of the inflation, the tubular tether belt 11a is hardly subjected to resistance upon extension thereof. When the airbag 10 undergoes inflation and expansion from the stitched part 11c, the airbag 10 undergoes expansion toward the occupant side while subjected to resistance upon passing through the anticipated rupture part 14h of the holding member 14. Accordingly, surface portion of the airbag 10 will sequentially be expanded toward the occupant side, while maintaining a degree of an internal pressure without causing halfway collapse of folded and contained airbag 10.

Meanwhile, FIG. 12A shows the fully stretched tubular tether belt 11a to its full length. Parts of the back side portion of the airbag 10 are inflated and expanded toward the occupant side, but the stitched part 10c formed by stitching together the respective outer circumferential edges of the two pieces of the base fabrics substantially circular in shape is positioned in the vicinity of the steering wheel 50, and other parts of the back side portion of the airbag 10 are still contained in the holding member 14. After the airbag has inflated to a degree, the position of the stitched part 10c shifts from the right-hand part of the figure toward the left as far as substantially the center along the center line of the tubular tether belt 11a, whereupon the airbag 10 is turned into the flat spherical shape, as shown in FIG. 12B, thereby completing the inflation and expansion. Reference numeral 12' denotes the gas rectification member.

The airbag 10 exhibits a behavior whereby expansion thereof toward the occupant side is stopped following the tubular tether belt 11a stretching to its full length as described above, this behavior is to stop the rapid stretch of the tubular tether belt 11a due to the internal pressure immediately after splitting and to temporarily increase an internal pressure of the airbag inside the airbag cover 16 to obtain a splitting and tearing force, and in association with such stopping action, the airbag 10 is stretched, however, since a volume of the airbag 10 rapidly increases concurrently with expansion thereof, the internal pressure rapidly decreases. Whereas the airbag 10 itself tends to stretch by an inertial force thereof, however, the expansion of the airbag 10 toward the occupant side is stopped before the internal pressure sufficiently increases due to stoppage of the stretching of the tubular tether belt 11a and resistance by the holding member 14.

With the first embodiment of the invention, an expansion velocity toward the occupant side after the stopping action is actually decreased by half as compared with a stretch velocity of the remaining parts of the airbag 10 within the holding member 14, since the central part of the airbag 10 cannot shift toward the occupant side, harmfulness against occupants will decrease as compared with the case of an airbag device without the tubular tether belt 11a.

Such an advantageous effect as above is not limited to the case of the tubular tether belt 11a according to the first embodiment, and the same effect is obtained in the case where a usual flat tubular tether belt is provided.

FIGS. 13A to 13D are views showing the expanding airbag 10 of the airbag device M1 according to the first embodiment. FIGS. 13A to 13D show the expanding airbag at the same timing in order to compare with the expanding airbag 10 of the prior art shown in FIG. 21A to FIG. 21D respectively.

Figure 13A:
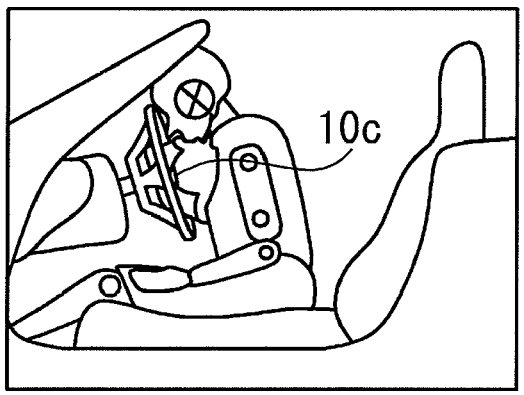
FIG. 13 shows a view showing each state of inflation of the airbag with respect to time elapsed from the initial expansion of the airbag of the airbag device according to a first embodiment of the invention.

At the timing in FIG. 13A, it is found that the shape of the inflating and expanding airbag 10 undergoes inflation and expansion only at its surface portion and each volume of upper and lower portions of the airbag 10 is substantially the same, and the airbag 10 bursts out in a state where the position of the stitching part 10c formed by stitching outer circumferential edges of two pieces of cloth substantially circular in shape is positioned in the vicinity of the steering wheel 50. In other words, in the initial stage of inflation and expansion of the airbag 10, the airbag 10 undergoes inflation and expansion substantially concentrically in the order of being folded from the stitching part 11c which is formed by stitching the central part of the fabric and the tubular tether belt 11a.

Figure 13B:
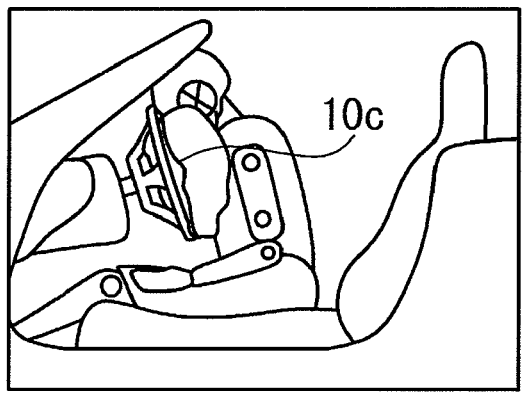

At the timing in FIG. 13B, it is found that only the front side of the airbag 10 undergoes inflation and expansion toward the occupant side and circumferential side, while parts of the upper and lower portions of the airbag 10 at the back portion undergo inflation and expansion not toward the occupant side but toward the back side of the steering device, and the airbag 10 undergoes inflation and expansion in a state where the position of the stitching part 10c remains in the vicinity of the steering device in the same manner as the case of FIG. 13A. At the timing in FIG. 13C, it is found that the front side of the airbag 10 further undergoes inflation and expansion toward the occupant side and circumferential side compared with the state in FIG. 13B, and the parts of the upper and lower portions of the airbag 10 at the backward portion continue to further undergo inflation and expansion toward the back side of the steering device, while the airbag 10 undergoes inflation and expansion with the stitching part 10c still remaining in the vicinity of the steering device in the same manner as shown in FIG. 13B. At the timing in FIG. 13D, it is found that the position of the stitching part 10c moves from the portion in the vicinity of the steering device to the occupant side, and the backward portion of the airbag 10 undergoes inflation and expansion toward the passenger side.

Figure 21A:
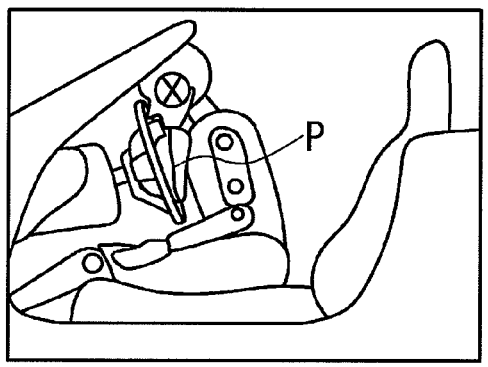
FIG. 21 shows a view showing each state of inflation of the airbag with respect to time elapsed from the initial stage of the expansion of the airbag of a conventional airbag device.
Figure 21B:
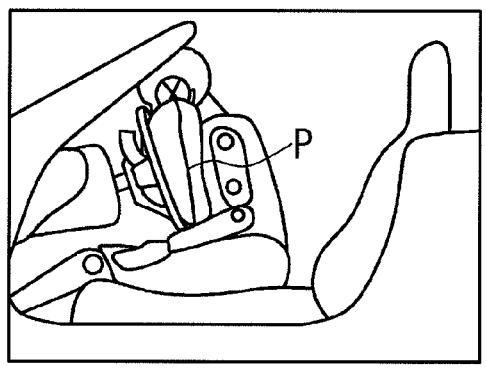
Figure 21C:
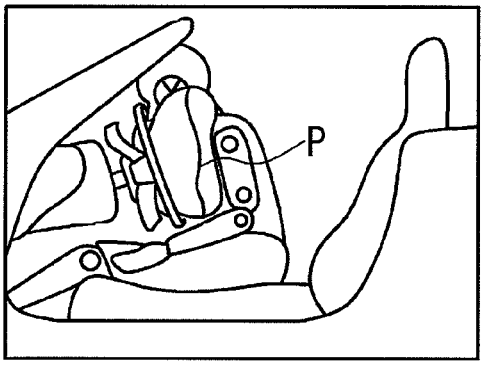
Figure 21D:
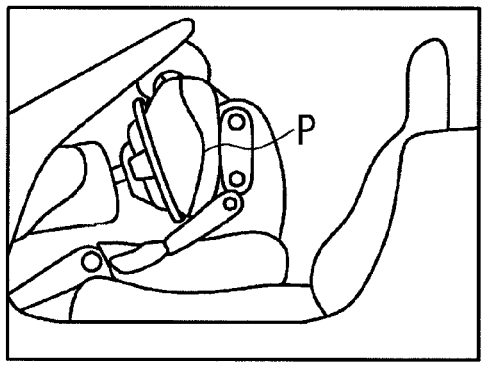

Comparing the expanding state of the airbag 10 according to the first embodiment with that of the conventional airbag device, at the timing in FIG. 21B showing the conventional airbag device, since the lump of the airbag 10 bursts out under the chin of the dummy, then at the timing in FIG. 21C, airbag covers from the chin to the cheek, while at the timing in FIG. 21D, the face of the dummy is covered with the airbag, it is assumed that the inner pressure quickly increases around the lower periphery of the chin to cause the membrane phenomenon to occur.

Figure 13C:
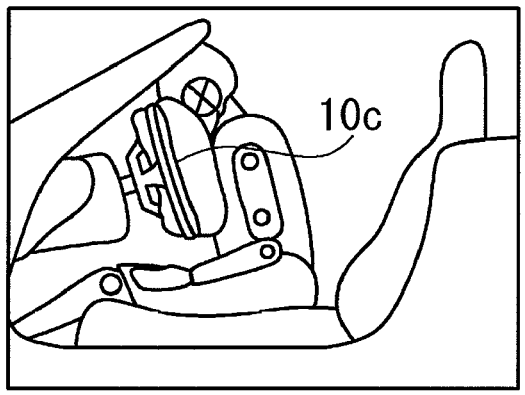
Figure 13D:
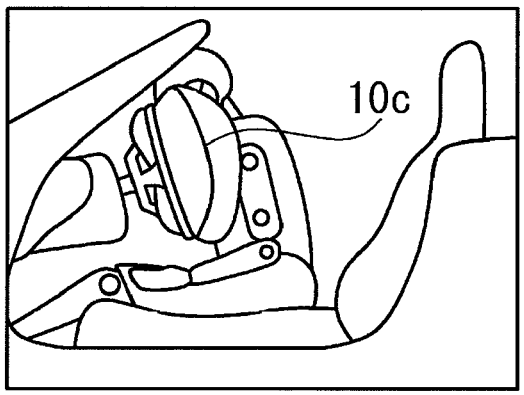

On the other hand, it is evident that at the timing in FIG. 13B of the first embodiment, only the front portion of the airbag 10 undergoes inflation and expansion toward the occupant side and circumferential side so that the front portion of the airbag 10 directly contacts the occupant, thereafter at the timing in FIG. 13C, only the front portion of the airbag 10 contacts the head of the passenger even in the case where the front portion of the airbag 10 still further undergoes inflation and expansion toward the occupant side and circumferential side, thereby preventing the occurrence of the membrane phenomenon. Further, the expanding states of the airbag 10 in FIGS. 13A to 13D show that the airbag undergoes expansion sequentially and orderly starting from a region where the expansion ought to be started.

Accordingly, the airbag device M1 according to the first embodiment does not cause the membrane phenomenon to occur in a state where the stitching part 10c corresponding to the maximum diameter of the airbag 10 hang on the neck.

Figure 14:
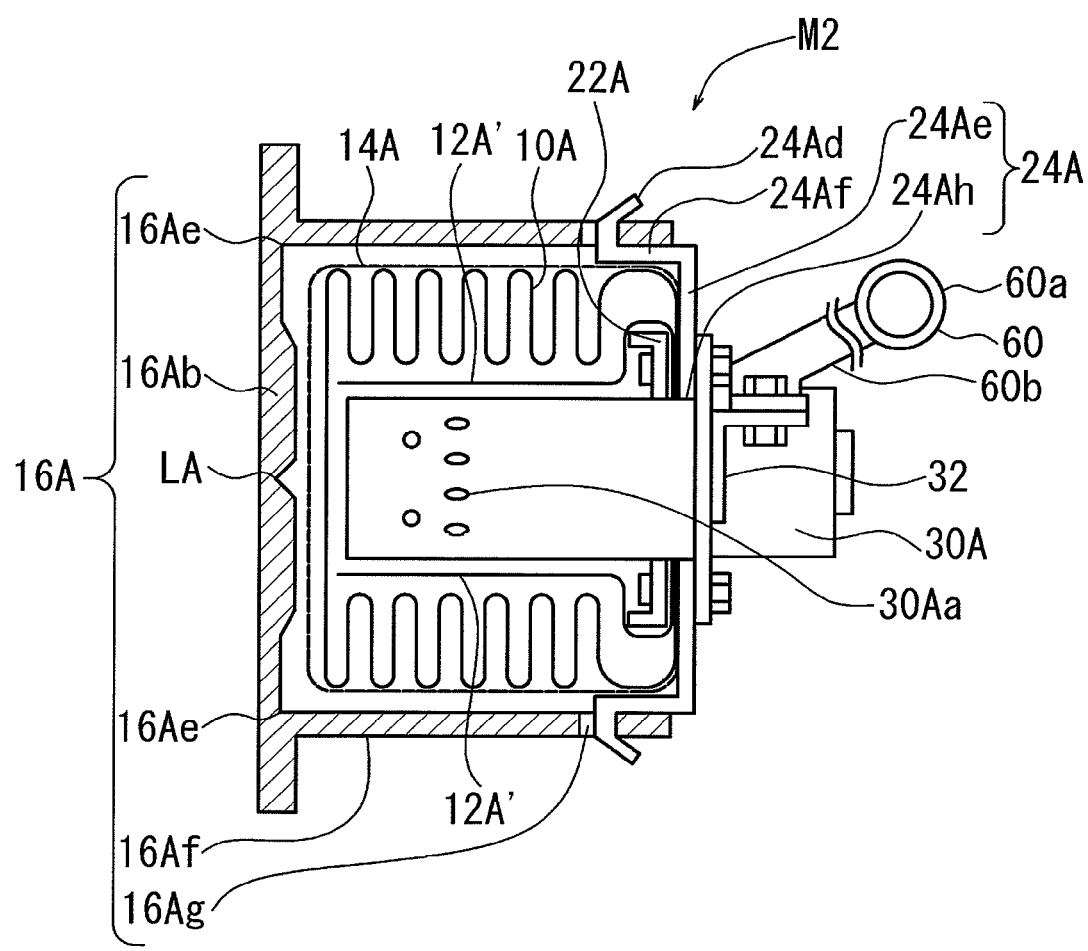
FIG. 14 is a view showing an airbag device for a front passenger seat according to a second embodiment of the invention.

Subsequently, there is described hereinafter an airbag device M2 for a front passenger seat according to a second embodiment of the invention. As shown in FIG. 14, the airbag device M2 comprises an folded airbag 10A, an inflator 30A for feeding a gas for inflation to the airbag 10A, and an airbag cover 16A in the shape of an approximately square cylinder for containing the airbag 10A, and the inflator 30A therein. The airbag device M2 is substantially the same in structure as the airbag device M1, and in describing the structure of the airbag device M2, like elements are given like reference numerals with "A" suffixed.

The airbag cover 16A is made up such that a tear-line LA disposed in the shape resembling the letter H is provided on the back side of the head in the shape of the approximately square cylinder in such a way as to enable the airbag cover 16A to be split into two pieces of cover pieces 16Ab to open, and the two pieces of the cover pieces 16Ab can open toward an upper side and a lower side respectively, as seen from the plane of the figure, with an upper edge and a lower edge of the respective cover pieces 16Ab, each serving as a hinge 16Ae. Further, a connecting wall unit 16Af in the shape of an approximately square cylinder protruding downward is provided on the back side of the head in the shape of the approximately square cylinder in such a way as to surround respective positions where the two pieces of the cover pieces 16Ab are to be disposed.

A plurality of stopper holes 16Ag are penetrated through respective predetermined positions of upper and lower walls of the connecting wall unit 16Af, opposed to each other. Stopper fingers 24Ad formed on a base plate 24A are inserted into the stopper holes 16Ag respectively, thereby engaging the stopper fingers 24Ad with the connecting wall unit 16Af. The respective stopper fingers 24Ad are secured to the connecting wall unit 16Af in order to ensure connection of the connecting wall unit 16Af with the base plate 24A so that the airbag 10A at the time of inflation can smoothly push up the two pieces of the cover pieces 16Ab to thereby enable the tear-line LA to be ruptured.

As shown in FIG. 14, the base plate 24A comprises a bottom wall part 24Ae in the shape of a rectangular sheet, formed of a sheet metal substantially rectangular in shape, having a rectangular opening, on the upper end side thereof, and a sidewall part 24Af extending so as to be in the shape of an approximately square cylinder from the outer peripheral edge of the bottom wall part 24Ae upward toward the airbag cover 16A. The bottom wall part 24Ae is formed in the shape of a rectangular sheet extended longer from side to side, and the central part thereof is provided with an inflator attachment opening 24Ah circular in shape, through which an upper side part of an inflator 30A can be inserted from below the bottom wall part 24Ae upward toward the airbag cover 16A.

Figure 15:
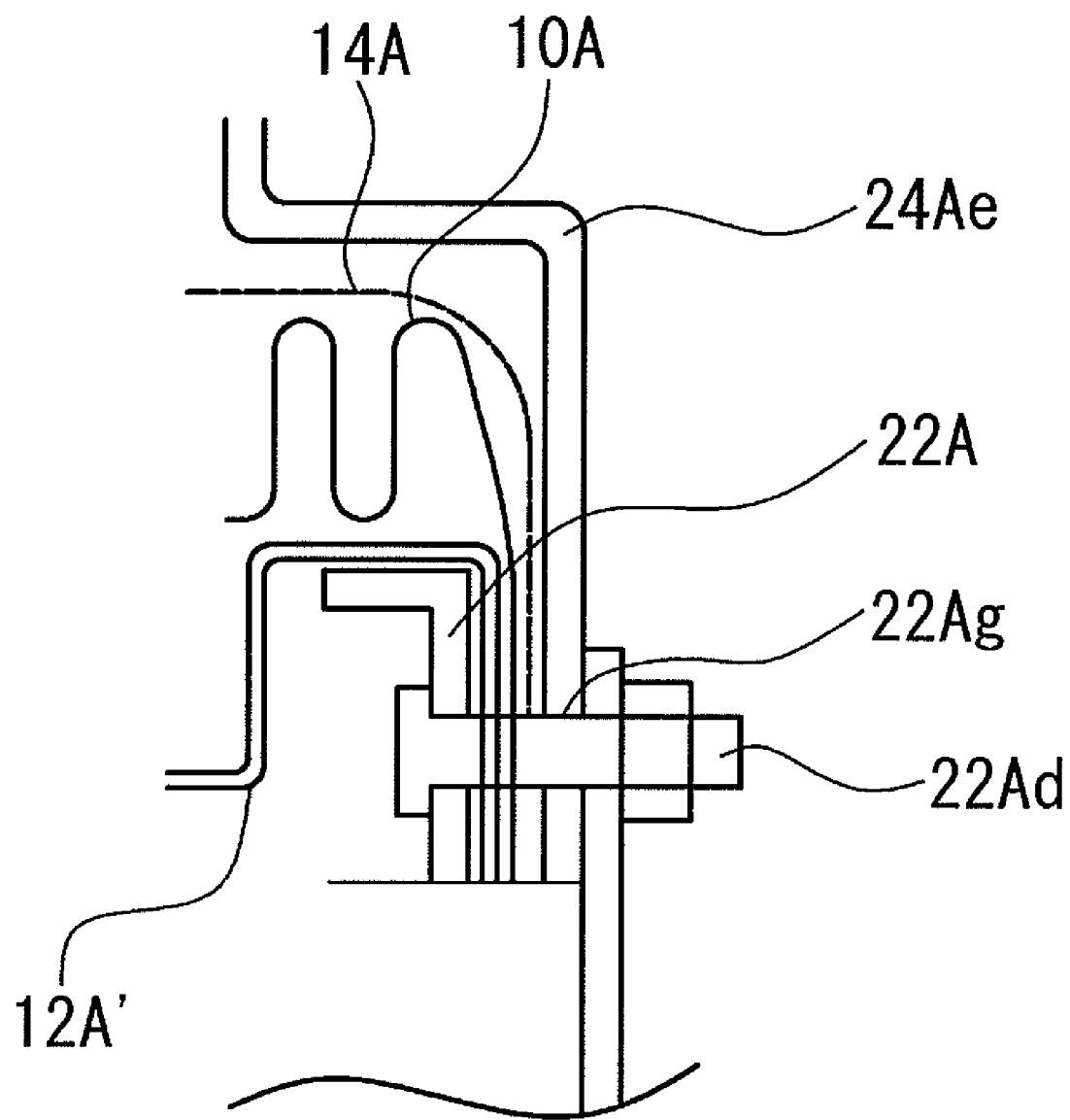
FIG. 15 is an enlarged view showing a clamped-secured state of a gas rectification member, an airbag and a holding member.

As shown in FIG. 15, attachment holes 22Ag through which respective bolts 22Ad of a cushion ring 22A can be inserted are formed on the peripheral edge of the inflator attachment opening 24Ah of the bottom wall part 24Ae. Further, as shown in FIG. 14, a bracket 32 for connecting the base plate 24A on the side of a vehicle body 60a is secured to the respective undersides of both the right and left side of the bottom wall part 24Ae. A nut for screwing a bolt into each of the respective brackets 32 is securely attached thereto. A bracket 60b extending from a reinforcement 60a is provided on the side of the airbag device M2, adjacent to the vehicle body 60, and a bolt is penetrated through an attachment seat of the bracket 60b to be screwed with a nut. By tightening up the nuts against the bolts, respectively, the airbag device M2 is attached to, and secured to the body 60.

Next, there is described a procedure for assembling the airbag device M2 with reference to FIGS. 14 and 15.

FIG. 15 is an enlarged view showing a gas rectification member 12A', the airbag 10A and a holding member 14A. As is the case with the airbag 10 of the airbag device M1, except for the tubular tether belt 11a, the folded airbag 10A for use in the airbag device M2, incorporating the cushion ring 22A, described with reference to FIGS. 8A to 8D, is covered with the holding member 14A. The airbag 10 covered with the holding member 14A is contained in the airbag cover 16A, and the inflator attachment opening 24Ah of the base plate 24A is fitted onto the bolts 22Ad of the cushion ring 22A to thereby overlay the base plate 24A on the cushion ring 22A while the stopper fingers 24Ad of the base plate 24A are inserted into the stopper holes 16Ag of the airbag cover 16A respectively, to be secured thereto, thereby screwing nuts from the backside of the base plate 24A.

Thereafter, the base plate 24A, the cushion ring 22A and the inflator 30A are screwed together. By so doing, the gas rectification member 12A', the airbag 10A and a holding member 14A are clamped and secured between the cushion ring 22A and the base plate 24A, thereby completing assembling of the airbag device M2. Further, the shape of the airbag cover 16A of the airbag device M2 is not limited to that described as above, and decision on what shape is to be adopted for the airbag cover 16A can be made according to a design depending on an installation place of the airbag device M2, including, for example, the upper face of an instrument panel and so forth.

Further, since the airbag device M2 is not provided with the tether belt compared with the case of the airbag device M1, an expansion action of the airbag device M2 does not exhibit the behavior whereby expansion thereof toward the occupant side is temporarily stopped as described in FIGS. 10 and 11, and the airbag 10A undergoes inflation and expansion toward an occupant side while inflating from a portion thereof facing the occupant side with an internal pressure of the airbag maintained to a degree. Thus, because the airbag undergoes orderly inflation starting from the surface thereof on the occupant side by virtue of the gas rectification member 12A', even without the tether belt, and expands toward the occupant side after being subjected to resistance while passing through an opening of the holding member 14A, there will not occur a behavior whereby the airbag in whole bursts out in a lump concurrently with splitting and tearing of the airbag as folded, thereby inflicting harm on an occupant, so that occurrences of a punching phenomenon and a membrane phenomenon can be prevented with reliability.

Figure 16:
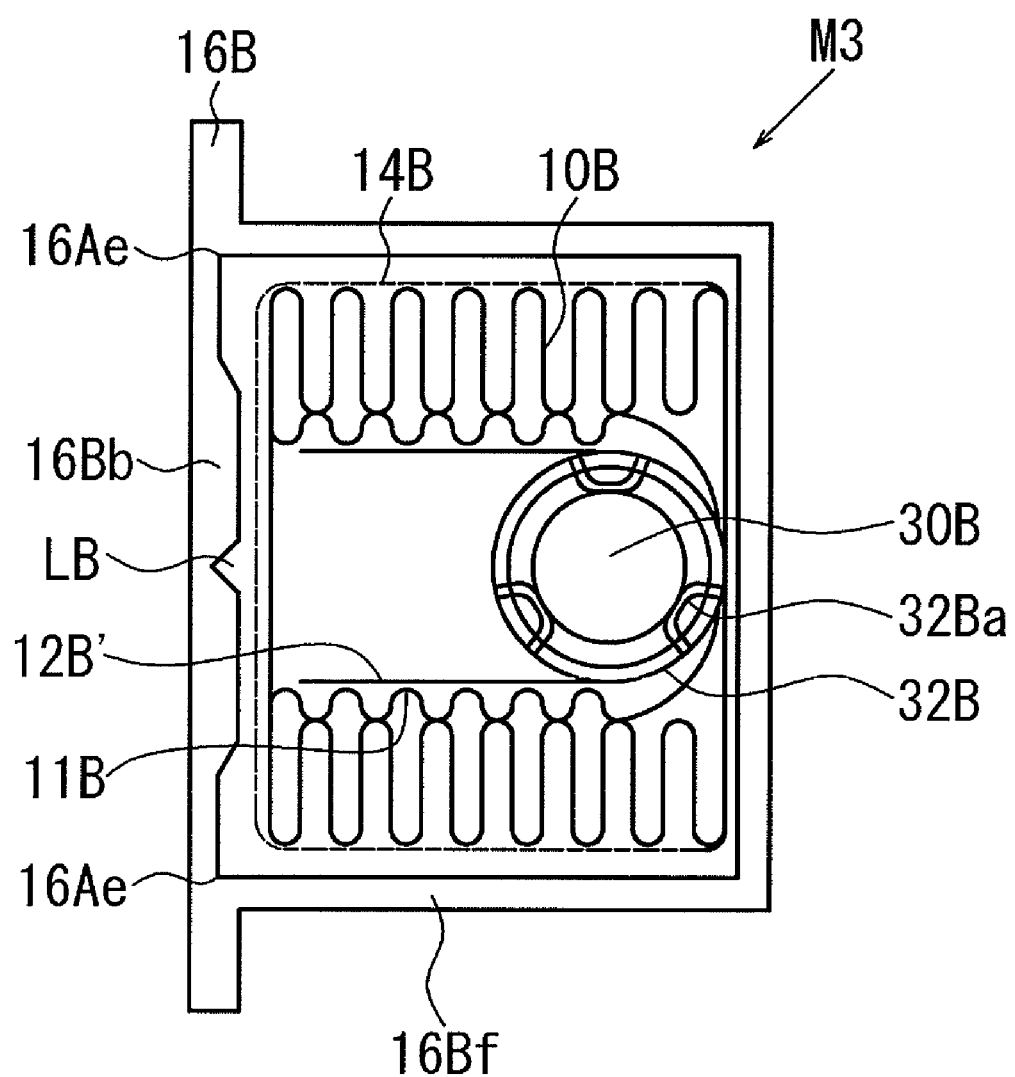
FIG. 16 is a schematic enlarged longitudinal sectional view of another airbag device for the front passenger seat.
Figure 17:
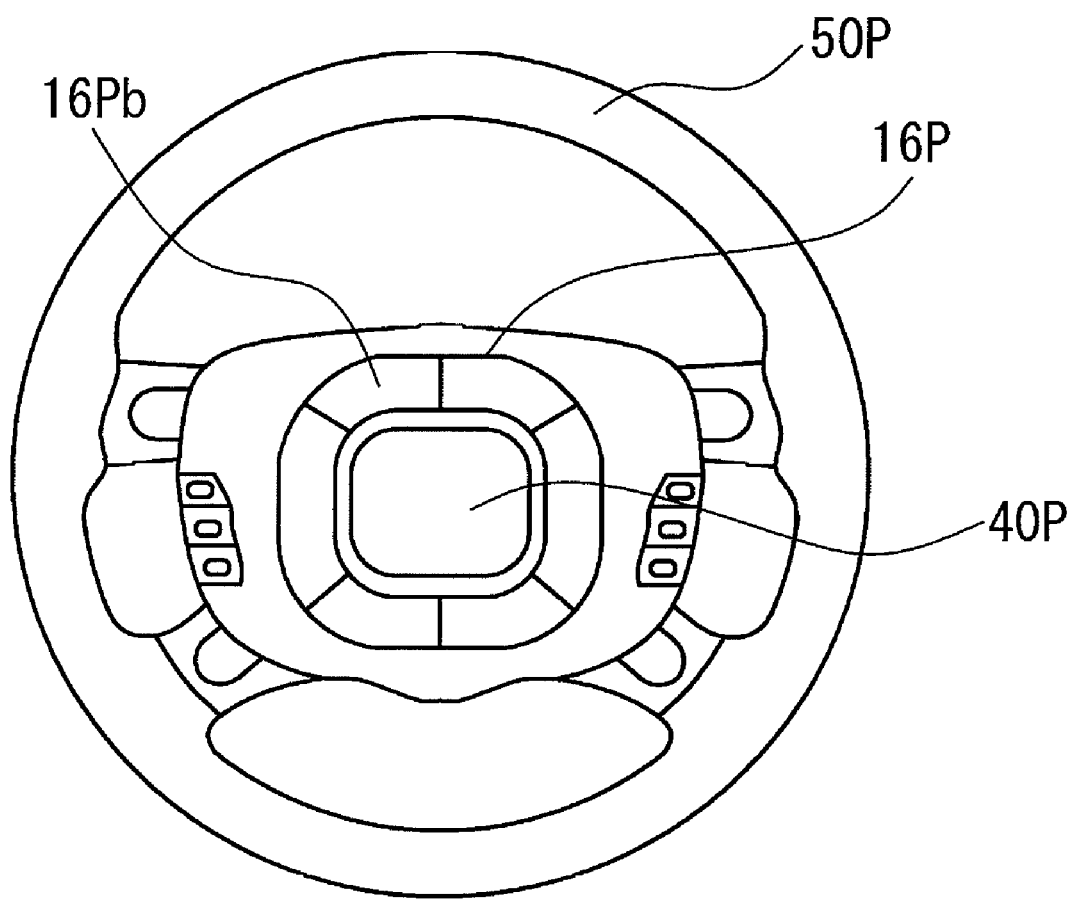
FIG. 17 is a front elevation showing a conventional airbag device fitted to a steering wheel.
Figure 18:
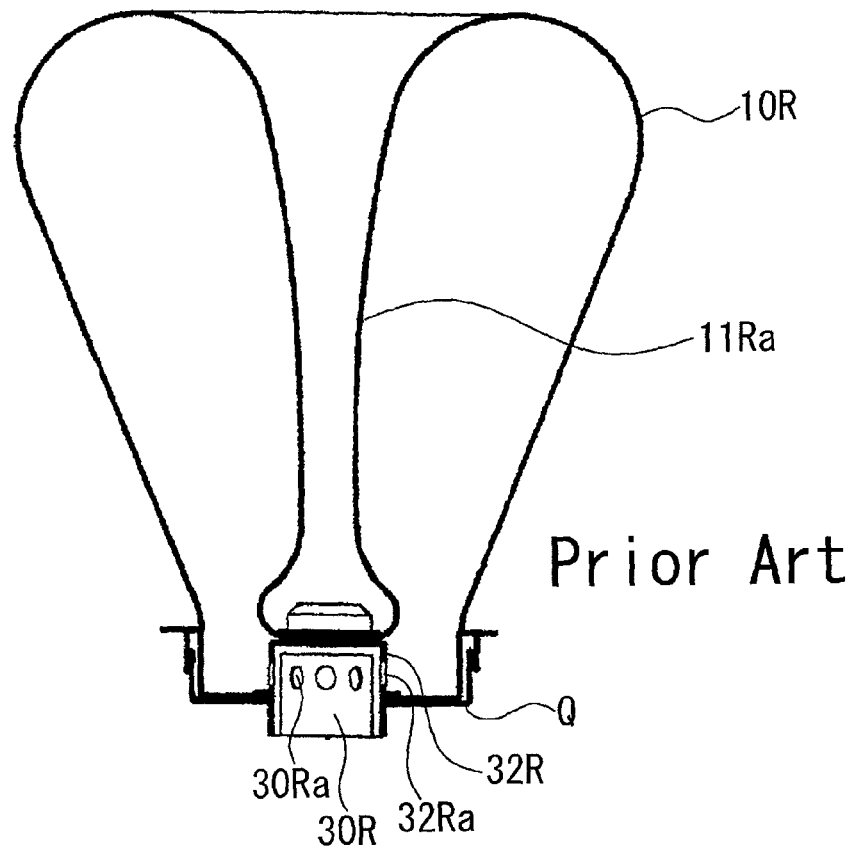
FIG. 18 is a view of showing an expanded conventional airbag.
Figure 19:
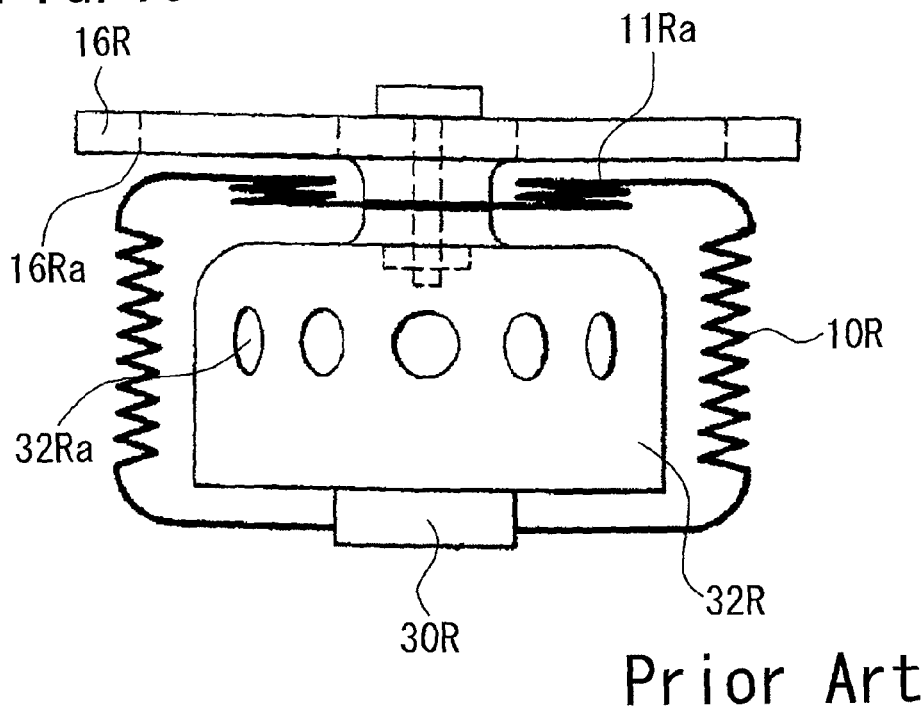
FIG. 19 is a view showing a state of containing of the conventional airbag.
Figure 20:
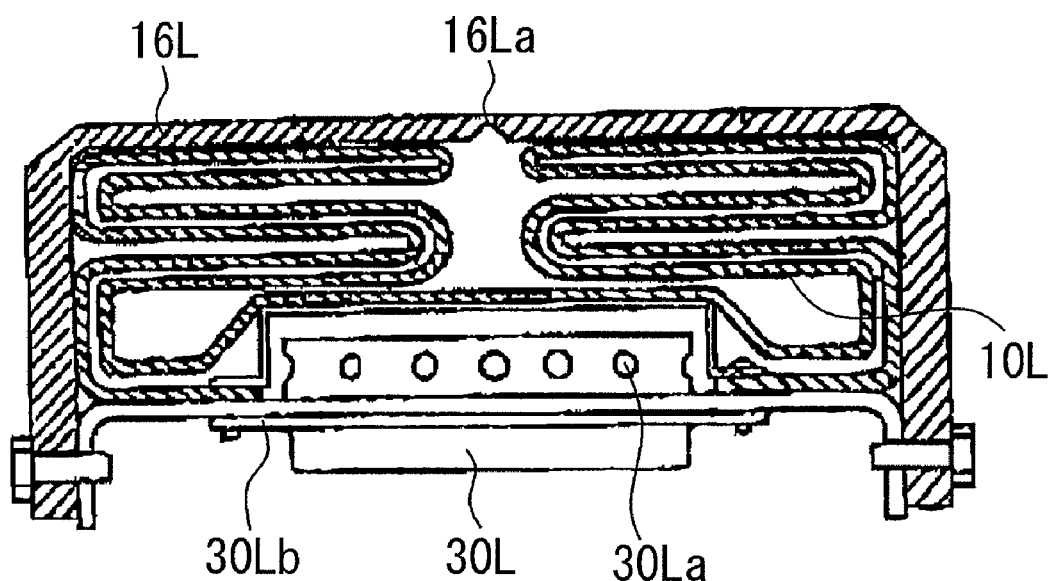
FIG. 20 is a view showing another contained conventional airbag.

Subsequently, there is described hereinafter an airbag device M3 for a front passenger seat according to a third embodiment of the invention. The airbag device M3 shown in FIG. 16 is substantially the same in structure as the airbag devices M1, M2, respectively, and members of the airbag device M3, identical to those of the airbag devices M1, M2, respectively, are denoted by like reference numerals with "B" suffixed. FIG. 16 is a schematic enlarged longitudinal sectional view of the airbag device M3 for the front passenger seat. The airbag device M3 comprises an folded airbag 10B, an inflator 30B substantially columnar in shape, contained in the airbag 10B, for feeding a gas for inflation, a diffuser 32B for containing the inflator 30B therein, and an airbag cover 16B in the shape of an approximately square cylinder, for containing the airbag 10B, and the inflator 30B therein.

The airbag cover 16B is provided with a tear-line LB disposed in the shape resembling the letter H on the back side of a head part of the approximately square cylinder to enable the airbag cover 16B to be split into two pieces of cover pieces 16Bb to open, and the two pieces of the cover pieces 16Bb can open toward an upper and a lower side as seen from the plane of the figure respectively, by making use of an upper and a lower edge of the respective cover pieces 16Bb as a hinge 16Ae.

Further, a connecting wall unit 16Bf in the shape of an approximately square cylinder, protruding downward is provided on the back side of the head part of the approximately square cylinder in such a way as to surround respective positions where the two pieces of the cover pieces 16Bb are to be disposed.

The diffuser 32B is secured to the airbag cover 16B by inserting bolts (not shown) into the respective holes provided at a plurality of fixture positions of both members 32B and 16B and securing them.

The diffuser 32B is disposed between the inflator 30B and the folded and contained airbag 10B and is provided with a plurality of gas exhaust holes (not shown) through which a gas for inflation can flow out, so that the airbag device M3 is structured such that upon actuation of the inflator 30B, a gas generated from the inflator 30B passes through the gas exhaust holes of the diffuser 32B to thereby apply pressure to the central part of the folded and contained airbag 10B.

Reference numeral 11B denotes a usual tether belt unlike the tubular tether belt as previously described, and reference numeral 12B' denotes a gas rectification member. Both the members 11B, 12B' together with the airbag 10B overlapped one another are inserted between the respective members 32B and 16B on fixedly attaching the diffuser 32B to the airbag cover 16B, and the respective members 11B, 12B are secured with bolts to be thereby being attached to the airbag device. Further, as is evident from FIG. 16, with the airbag device M3 employing the inflator 30B of the type described, the airbag 10B is not provided with the inflator attachment opening 10ah, but is provided with a communicating port for insertion of the inflator 30B, and the inflator 30B is inserted into the communicating port. Further, an airbag device wherein a gas from an inflator of an airbag device (not shown) into an airbag through a communicating port thereof from outside the airbag instead of inserting the inflator directly into the airbag is well known in the art.

Accordingly, the respective inflator attachment openings 10ah of the airbag 10, 10A used in the airbag devices M1, M2, respectively, the communicating port for insertion of the inflator 30B and the communicating port of the well known airbag have the same function as the communicating port for introducing the gas from the inflator into the airbag, therefore, when the word of communicating port of the inflator is used, it will be understood that it means the inflator attachment opening, the communicating port for insertion of the inflator and the communicating port of the well known airbag as well.

Thus, as is evident from the respective structures of the airbag devices M1, M2, and M3, shown in FIGS. 2, 14, and 16, respectively, in the initial stage when the gas is exhausted from the respective inflators 30, 30A and 30B, the gas generated from the respective exhaust ports 30a, 30Aa and 30Ba of the inflators 30, 30A, and 30B are rectified by the respective gas rectification members 12', 12A', and 12B', to be guided up to the vicinity of the part of the airbag, inflating in the initial expansion thereof, and concurrently, the holding member 14 prevents the airbag 10 from inflating in the direction of both the sides thereof, so that the respective airbags 10, 10A, 10B undergo sequential and orderly expansion starting from a region where the expansion ought to be started, thereby preventing a punching phenomenon whereby the airbag partially bursts out in a lump toward the occupant side.

If the respective folded airbags 10, 10A, 10B are disposed on respective outer peripheries of the protective members 12, 12A, 12B at this point in time, this will cause the respective folded airbags 10, 10A, 10B, to be compressed by a gas pressure of each of the inflators 30, 30A, 30B between the respective gas rectification member 12', 12A', 12B' and the holding member, so that the respective airbags 10, 10A, 10B can be firmly maintained in its contained state by a resultant compression force, and it is possible to prevent successfully occurrence of the punching phenomenon in which the airbag partially bursts out in the lump toward the occupant side as a result of collapse in the folded-states of the respective airbags 10, 10A, 10B, due to the impact given in the initial expansion thereof.

Further, if the respective airbags 10, 10A, 10B, are disposed as above described, this will lead to formation of a structure in which a force applied to the gas rectification members 12', 12A', 12B' respectively can be fended off with the respective airbags 10, 10A, 10B, so that the gas rectification members 12', 12A', 12B' no longer require a particular strength. Further, the protective member originally intended for protection of only the peripheral part 10d of the inflator communicating port 10ah can be used as the gas rectification members 12', 12A', 12B' and also as a protective member for protection of the whole inner face of each of the airbags. Still further, since the protective member spreads from the peripheral portion 10d of the inflator communicating port 10ah toward the outer circumference of the concentric circles, when the protective member is disposed on the inner circumference side of each of the folded airbags 10, 10A, 10B, the respective protective members 12, 12A, 12B are actually multiple-folded to thereby form pleats. As a result, with just one sheet of the protective member, it is possible to obtain the same protection effect as is obtained with several sheets of the protective member, and further, the respective airbags 10, 10A, 10B, in whole, can be quite efficiently protected.

With the first embodiment, the stitched part 10c shown in FIG. 13A formed by stitching respective outer circumferences of the fabric of the front portion of the airbag 10 and the fabric of a lower portion thereof with each other, is temporarily positioned in the vicinity of the steering wheel 50 in the initial expansion of the airbag 10 undergoing inflation and expansion, and the stitched part 10c does not shift toward the driver seat side before rising of an internal pressure of the airbag. Accordingly, even in the OOP state in which an occupant is not seated at the normal seating position, the airbag undergoes inflation such that the surface of the airbag 10, on the occupant's side, comes into contact with the occupant without fail, as shown in FIG. 13, thereby eliminating the risk of the occupant sustaining an injury due to the membrane phenomenon occurring when the stitched part 10c where the airbag 10 has the largest diameter will wrap around the neck of the occupant. Furthermore, if the resistance given by the holding member, when the airbag 10 undergoes expansion, is further increased, the punching phenomenon will be further lessened. The same applies to the second and third embodiments, respectively.

The airbag device M1 according to the first embodiment is provided with the tubular tether belt 11a, however, even if a string-like tether belt is installed instead, the airbag device M1 can carry out the same action and effect as those for the case where the tubular tether belt 11a is installed. Further, if the folded and contained airbag 10 is held by the holding member 14 even without a tether belt, it is possible to lessen the punching phenomenon while accelerating an expansion velocity of the airbag 10, toward the occupant side, and to cause the airbag 10 in whole to undergo uniform inflation to be thereby inflated into a shape capable of quickly protecting the occupant.

Further, as adaptability to the airbag device M1 for the driver seat is described with reference to the first embodiment, and adaptability to the airbag device M2 for the front passenger seat is described with reference to the second and third embodiments respectively, the invention is adaptable to the airbag devices for the driver seat, and the front passenger seat, respectively. Further, installation of the respective airbag covers 16, 16A, 16B is not a prerequisite for the invention, and with the invention, it is intended that the respective folded and contained airbags 10, 10A, 10B are orderly expanded by restraining those airbags by the respective holding members 14, 14A, 14B, regardless of whether or not the respective airbag covers 16, 16A, 16B are installed.

With the first, second and third embodiments using the airbag covers 16, 16A, 16B together with the holding members 14, 14A, 14B respectively, in order to speed up the start of the expansion, it is effective to dispose the respective tear-lines L, LA, LB of the airbag covers 16, 16A, 16B, in such a way as to oppose respective initially expanding parts of the airbag covers 16, 16A, 16B. With the first embodiment, the airbag device using a pyro-type inflator is described, however, the invention is not limited thereto, and with the use of either a hybrid-type inflator or a stored-type inflator, the same effect can be obtained. Further, the gas rectification member formed of the same fabric as the base fabric of the airbag is described, however, the invention is not limited thereto, and for the gas rectification member, various constituent materials including metal can be utilized.

What is claimed is:

1. An airbag device comprising:
    an inflator;
    an airbag communicating with the inflator for undergoing inflation by a gas generated from the inflator;
    a holding member for holding the airbag in a state as folded and contained therein, and pressing down on an outer circumference of the airbag, to thereby restrain inflation and expansion of the airbag in a direction extending from a center of the airbag to the outer circumference of the airbag, caused by the gas generated from the inflator at least in an initial stage of the inflation of the airbag; and
    a gas rectification member for rectifying and guiding the gas generated from the inflator up to the vicinity of a part of the airbag, inflating in the initial stage of the inflation thereof, which is provided substantially at a central part of the airbag,
    wherein the holding member is formed to have a hole at the time of inflation of the airbag so that the airbag travels through the hole during inflation,
    wherein the gas rectification member is not attached to a part of the airbag which expands during the inflation of the airbag,
    wherein the airbag has a folded portion,
    wherein the folded portion of the airbag is provided between the holding member and the gas rectification member in a radial direction of the airbag during the initial stage of inflation,
    wherein the holding member is separate from an airbag cover, and
    wherein the opening in the holding member is sized to allow a part of the airbag cover to pass through the opening of the holding member.

2. The airbag device according to claim 1, wherein the airbag is folded and contained on a side of the outer circumference of the gas rectification member.

3. The airbag device according to claim 1, wherein the gas rectification member is tubular in shape, the airbag is provided with an inflator communicating port for communicating with the inflator, and the gas rectification member is extended from a peripheral edge of the inflator communicating port up to the vicinity of the part of the airbag that will inflate in the initial stage of the inflation thereof.

4. The airbag device according to claim 1, wherein the gas rectification member is made of a woven cloth.

5. The airbag device according to claim 1, wherein the gas rectification member is disposed as a member having a function for protecting the airbag from heat of the inflator and an impactive pressure thereof.

6. The airbag device according to claim 1, wherein the holding member is made of a woven cloth for containing the airbag covered thereby.

7. The airbag device according to claim 1, wherein the holding member is contained in the airbag cover.

8. The airbag device according to claim 7, wherein tear-lines to be split and torn upon generation of the gas in the inflator to thereby form an expansion port of the airbag are provided on a back side of the airbag cover.

9. The airbag device according to claim 1, wherein a tether belt for restraining an extension length of the airbag toward an occupant side, is disposed in the airbag.

10. The airbag device according to claim 1, wherein tear-lines are provided in the holding member to allow the hole to be formed in the holding member during inflation.

11. The airbag device according to claim 1, wherein the gas rectification member compresses the folded portion of the airbag against the holding member so that side portions of the airbag are smoothly delayed in expanding at least in the initial stage of the inflation.

12. The airbag device according to claim 1, wherein the airbag undergoes expansion toward the occupant side while subjected to resistance by the holding member, upon passing through the opening of the holding member, while parts of a back side portion of the airbag are contained in the holding member.

13. An airbag device comprising:
an inflator;
an airbag communicating with the inflator for undergoing inflation by a gas generated from the inflator;
a holding member for holding the airbag in a state as folded and contained therein, and pressing down on an outer circumference of the airbag, to thereby restrain inflation and expansion of the airbag in a direction extending from a center of the airbag to the outer circumference of the airbag, caused by the gas generated from the inflator at least in an initial stage of the inflation of the airbag; and
a gas rectification member for rectifying and guiding the gas generated from the inflator up to the vicinity of a part of the airbag, inflating in the initial stage of the inflation thereof, which is provided substantially at a central part of the airbag,
wherein the holding member is formed to have a hole at the time of inflation of the airbag so that the airbag travels through the hole during inflation,
wherein the gas rectification member is not attached to a part of the airbag which expands during the inflation of the airbag,
wherein the airbag has a folded portion,
wherein the folded portion of the airbag is provided between the holding member and the gas rectification member in a radial direction of the airbag during the initial stage of inflation,
wherein the holding member is separate from an airbag cover, wherein the gas rectification member has multiple folded pleats thereon.

14. An airbag device, comprising:
an inflator;
an airbag communicating with the inflator for undergoing inflation by a gas generated from the inflator;
a holding member for holding the airbag in a state as folded and contained therein, and pressing down on an outer circumference of the airbag, to thereby restrain inflation and expansion of the airbag in a direction extending from a center of the airbag to the outer circumference of the airbag, caused by the gas generated from the inflator at least in an initial stage of the inflation of the airbag; and
a gas rectification member for rectifying and guiding the gas generated from the inflator up to the vicinity of a part of the airbag, inflating in the initial stage of the inflation thereof, which is provided substantially at a central part of the airbag,
wherein the holding member is formed to have a hole at the time of inflation of the airbag so that the airbag travels through the hole during inflation,
wherein the gas rectification member is not attached to a part of the airbag which expands during the inflation of the airbag,
wherein the airbag has a folded portion,
wherein the folded portion of the airbag is provided between the holding member and the gas rectification member in a radial direction of the airbag during the initial stage of inflation,
wherein the holding member is separate from an airbag cover,
wherein the outer circumference of the airbag surrounds an area when the airbag is folded and contained within the holding member prior to inflation,
wherein the hole of the holding member surrounds an area at the time of inflation, and
wherein the area surrounded by the hole of the holding member at the time of inflation is smaller than the area surrounded by the outer circumference of the airbag when the airbag is folded and contained within the holding member prior to inflation.

* * * * *